US012631879B2

(12) United States Patent
O'Duffy

(10) Patent No.: US 12,631,879 B2
(45) Date of Patent: May 19, 2026

(54) METHODS, APPARATUS, AND ARTICLES TO ENHANCE BRAIN FUNCTION VIA PRESENTATION OF VISUAL EFFECTS IN FAR AND/OR ULTRA-FAR PERIPHERAL FIELD

(71) Applicant: DRAGONFLY OPTICS LLC, Kirkland, WA (US)

(72) Inventor: Jonathan O'Duffy, Kirkland, WA (US)

(73) Assignee: DRAGONFLY OPTICS LLC, Kirkland, WA (US)

( * ) Notice: Subject to any disclaimer, the term of this patent is extended or adjusted under 35 U.S.C. 154(b) by 649 days.

(21) Appl. No.: 18/099,525

(22) Filed: Jan. 20, 2023

(65) Prior Publication Data

US 2023/0296895 A1     Sep. 21, 2023

Related U.S. Application Data

(60) Provisional application No. 63/415,799, filed on Oct. 13, 2022, provisional application No. 63/319,563, (Continued)

(51) Int. Cl.
G02B 27/01          (2006.01)

(52) U.S. Cl.
CPC .... G02B 27/017 (2013.01); *G02B 2027/0178* (2013.01)

(58) Field of Classification Search
CPC .......... G02B 27/017; G02B 2027/0178; A61H 2201/165; A61H 2201/1604;
(Continued)

(56) References Cited

U.S. PATENT DOCUMENTS 8,625,200 B2    1/2014  Smith et al.
8,845,096 B1 *  9/2014  Cohen .................... G06F 3/012
                                                   351/203
(Continued)

FOREIGN PATENT DOCUMENTS

WO      2019183046 A1     9/2019
WO      2020138012 A1     7/2020
WO      2021016480 A1     1/2021

OTHER PUBLICATIONS

International Search Report and Written Opinion, mailed May 10, 2023, for PCT/US2023/060832, 12 pages.
(Continued)

*Primary Examiner* — William R Alexander
(74) *Attorney, Agent, or Firm* — Cozen O'Connor

(57)          ABSTRACT

Visual effects presented in at least an ultra-far peripheral horizontal static field of the eyes of a user improve or enhance brain function, homeostasis and performance. The visual effects are non-contextual with respect to content appearing in a central field of vision, and do not constitute a cursor, a user input field or other user interface element. The ultra-far peripheral horizontal static field extends rearwardly from a fovea centralis of the eye in a straight ahead static gaze direction to 100 degrees or more rearwardly from the fovea centralis. Such can be used to treat or improve: traumatic brain injury; acuity, focus, visual convergence, visual sustainability, visual processing, visual field, retinal health, brain field health, visual discrimination, visual spatial memory, ocular motility, pursuits and saccades, hold fixation, convergence/divergence, eye alignment, depth perception, Phorias, occipital cortex, blink rate, pain, migraine headaches, and/or balance of the user or human subject.

23 Claims, 9 Drawing Sheets

Related U.S. Application Data filed on Mar. 14, 2022, provisional application No. 63/301,787, filed on Jan. 21, 2022.

(58) Field of Classification Search
CPC .. A61H 2201/1609; A61H 5/00; A61H 23/02; A61M 2205/507; A61M 2210/0612; A61M 2230/06; A61N 5/0618
USPC ........................... 359/630; 351/158, 206, 209
See application file for complete search history.

(56) References Cited

U.S. PATENT DOCUMENTS

| | | | | |
|---|---|---|---|---|
| 2014/0002629 | A1* | 1/2014 | Ratcliff | H04N 7/188 |
| | | | | 351/158 |
| 2014/0320817 | A1* | 10/2014 | Kiderman | A61B 3/11 |
| | | | | 351/209 |
| 2016/0370583 | A1* | 12/2016 | Saarikko | G02B 6/34 |
| 2018/0133504 | A1* | 5/2018 | Malchano | A61B 5/0036 |
| 2018/0133507 | A1 | 5/2018 | Malchano et al. | |
| 2018/0321484 | A1* | 11/2018 | Bailey | G02B 27/30 |
| 2019/0250408 | A1 | 8/2019 | Lafon et al. | |
| 2019/0255350 | A1* | 8/2019 | Malchano | A61B 5/4088 |
| 2020/0294652 | A1 | 9/2020 | Burdea et al. | |
| 2020/0311951 | A1 | 10/2020 | Suegami et al. | |
| 2021/0263696 | A1 | 8/2021 | Bevilacqua et al. | |
| 2021/0339043 | A1* | 11/2021 | Malchano | G16H 40/67 |
| 2022/0008746 | A1* | 1/2022 | Malchano | A61B 5/4088 |

OTHER PUBLICATIONS

Australian Examination Report mailed Jul. 30, 2025, Application No. 2023209431, 4 pages.

Australian Examination Report mailed Aug. 26, 2025, Application No. 2023209431, 7 pages.

Simpson MJ. Mini-review: "Far peripheral vision". Vision Res. Nov. 2017; 140:96-105. doi: 10.1016/j.visres.2017.08.001. Epub Sep. 11, 2017. PMID: 28882754.

Search Report mailed Dec. 18, 2025, in EP App No. 23743877.5, 11 pages.

\* cited by examiner

METHODS, APPARATUS, AND ARTICLES TO ENHANCE BRAIN FUNCTION VIA PRESENTATION OF VISUAL EFFECTS IN FAR AND/OR ULTRA-FAR PERIPHERAL FIELD

CROSS-REFERENCE(S) TO RELATED APPLICATIONS

This patent application claims priority of U.S. Patent Application No. 63/301,787, filed on Jan. 21, 2022; U.S. Patent Application No. 63/319,563, filed on Mar. 14, 2022; U.S. Patent Application No. 63/415,799, filed on Oct. 13, 2022, the entire disclosures of which are hereby incorporated by reference herein for all purposes.

FIELD

This disclosure generally relates to methods, apparatus, and articles that enhance human brain function via presentation of visual effects in a far and/or ultra-far peripheral field of a human, the visual effects typically being non-contextual (having no context or a context unrelated with any content in a central visual field of the user).

BACKGROUND

Description of the Related Art

There is a large range of ailments and/or brain related issues that various humans suffer from or which the improvement of would be beneficial. Humans can, for example suffer from traumatic brain injury. Humans may have a lack of acuity, focus, visual convergence, visual sustainability, visual processing, visual perception, color vision or perception, visual field, retinal health, brain field health, visual discrimination, visual spatial memory, ocular motility, pursuits and saccades, hold fixation, convergence/divergence, eye alignment, depth perception, Phorias, occipital cortex, blink rate, digital eye strain, dry eyes, and/or balance. Any one or more of these can have a serious detrimental effect on an individual, leading to negative life-long problems.

For example, a traumatic brain injury may harm portions of the brain associated with visual processing or perception. Such can result in blurred vision, double vision, loss of vision, accommodation and convergence/divergence issues, photophobia, a decrease in peripheral vision along with other adverse effects. Therapy for those suffering from traumatic brain injury can include balancing on a balance board, tossing a ball or working with a Brock string.

There are many traits or characteristics used to assess a human's visual system. Assessment can, for example, include assessment of any one or more of: acuity, focus, convergence, sustainability, visual processing, visual field, retinal health, brain field health, visual discrimination, visual spatial memory, ocular motility, pursuits and saccades, hold fixation, convergence/divergence, eye alignment, depth perception, phorias, and/or occipital cortex.

The visual system is generally treated as constituting a central vision system and a peripheral vision system. When the central vision system is used for tasks that require focus, the sympathetic nervous system (e.g., fight or flight) is engaged. In contrast, peripheral vision system is generally associated with relaxation, viewing objects in the dark, spatial awareness, the sense of balance and grounding one in their environment.

BRIEF SUMMARY

This disclosure generally relates to methods, apparatus, and articles that enhance human aliments and/or brain function via presentation of visual effects in a far and/or ultra-far peripheral horizontal static field of a human. The methods, apparatus, and articles can advantageously enhance voluntary and/or autonomic functional aspects of conditions associated with vision: sensor, perceptual and cognitive. The presented visual effects are typically non-contextual, that is the presented visual effects either have no context or a context that is unrelated with content in a central visual field of the user, if any. The presented visual effects can be visually inconspicuous or visually imperceptible via the normal central vision system of the brain. Activation of the peripheral vision system can shift a person from primarily relying on their sympathetic system to primarily relying on their parasympathetic system.

The term visual effects is used herein to describe effects that are "visual" in that the effects are in the form of light, for example light that falls in the range of electromagnetic wavelengths of normal human vision (about 380 nanometers to about 750 nanometers) and possibly light that fall in the infrared or ultraviolet portions of the electromagnetic spectrum. The visual effects are typically presented in a far peripheral field and/or in an ultra-far peripheral field of a human subject, thus may not be visually perceived or visually perceptible but the human subject, yet such may still have a positive impact on aliments and/or brain function, the visual effects for example improving cognition by the human subject with respect to an object residing in or an image that is presented in a central or primary vision field of the human subject.

The term ultra-far peripheral horizontal static field refers to a field which extends rearwardly from a fovea centralis (e.g., a perpendicular that extends forwardly of the pupil) of the respective eye when the respective eye is in a straight ahead static gaze direction to 100 degrees or more (e.g., 110 degrees) rearwardly from the fovea centralis of the respective eye as viewed in a horizontal plane (e.g., when the subject is standing upright) also known as a transverse plane. The term static is employed to indicate a specific field relative to the head or an environmental frame of references, and such is not intended to mean that the eye or eyes remain fixed during use or treatment. The term far peripheral horizontal static field refers to a field which extends rearwardly from the fovea centralis of the respective eye when the respective eye is in the straight ahead static gaze direction to 60 degrees or more rearwardly from the fovea centralis of the respective eye as viewed in the horizontal plane (e.g., when the subject is standing upright) also known as the transverse plane. Again, the term static is not intended to mean that the eye or eyes remain fixed during use or treatment.

Visual effects can be used to treat or improve one or more of: traumatic brain injury; acuity, focus, visual acuity, visual convergence, visual sustainability, visual processing, visual perception, color vision or perception, visual field, retinal health, brain field health, visual discrimination, visual spatial memory, ocular motility, pursuits and saccades, hold fixation, convergence/divergence, eye alignment, ocular muscle strength and flexibility, eye teaming and binocular coordination, ocular alignment, eye movements, visual motor skills, depth perception, Phorias, occipital cortex, blink rate, digital eye strain, dry eyes, pain, migraine headaches, eye-hand coordination, eye-body coordination, and/or balance of a user or subject.

Qualitative results suggest that the devices and methods described herein can advantageously reduce and/or eliminate migraines and computer eye strain. It has also been found that the devices and methods described herein can induce a state of sleepiness depending on the settings that are being used. So the devices and methods described herein can not only be used to lower stress and anxiety, but also the potential be employed as a sleeping aid.

A method for use with a user having a pair of eyes can be summarized as including: successively generating, by at least one visual effects generator, a plurality of visual effects that are non-contextual with respect to content appearing in a central field of vision of at least one of the eyes and wherein the visual effects do not constitute a cursor, a user input field or other user input or control user interface element; and presenting, via at least one optic, the generated visual effects at least in a respective ultra-far peripheral horizontal static field of at least one of at least one of two eyes of a user, the ultra-far peripheral horizontal static field of each eye which extends rearwardly from a fovea centralis (e.g., perpendicular that extends forwardly of a pupil) of the respective eye in a straight ahead static gaze direction to at least 100 degrees or more rearwardly from the fovea centralis of the respective eye.

Successively generating a plurality of visual effects that are non-contextual with respect to content appearing in a central field of vision of at least one of the eyes can include successively generating a plurality of random visual effects. Successively generating a plurality of visual effects that are non-contextual with respect to content appearing in a central field of vision of at least one of the eyes can include successively generating the plurality of visual effects based at least in part on a task to be performed by the user. Successively generating a plurality of visual effects that are non-contextual with respect to content appearing in a central field of vision of at least one of the eyes can include successively generating the plurality of visual effects based at least in part on a treatment to be performed on the user.

The method can further include: successively generating, by at least one image generator, a plurality of images; and presenting, via the at least one optic, the generated images at least in a respective central field of vision of at least one of the eyes. The at least one optic can present the images with focusing or without focusing. Additionally or alternatively, the at least one optic can present the images with polarization or without polarization.

Successively generating a plurality of visual effects that are non-contextual with respect to content appearing in a central field of vision of at least one of the eyes can include successively generating a plurality of visual effects that are independent of content appearing in a central field of vision of at least one of the eyes.

Presenting the generated visual effects includes presenting the generated visual effects into the respective ultra-far peripheral horizontal field and into a far peripheral horizontal static field of at least one of the eyes, the ultra-far peripheral horizontal static field which extends rearwardly from the fovea centralis of the respective eye in the straight ahead static gaze direction to 100 degrees or more rearwardly from the fovea centralis of the respective eye and the far peripheral horizontal static field which extends rearwardly from the fovea centralis of the respective eye in the straight ahead static gaze direction to 60 degrees or more rearwardly from the fovea centralis of the respective eye. Presenting the generated visual effects includes presenting the generated visual effects into the respective ultra-far peripheral horizontal static field and into a far peripheral horizontal static field of at least one of the eyes, the respective ultra-far peripheral horizontal static field which extends rearwardly from the fovea centralis (e.g., perpendicular that extends forwardly of the pupil) of the respective eye in the straight ahead static gaze direction to 110 degrees or more rearwardly from the fovea centralis of the respective eye and the far peripheral horizontal static field which extends rearwardly from the fovea centralis of the respective eye in the straight ahead static gaze direction to 60 degrees or more rearwardly from the fovea centralis of the respective eye. Presenting the generated visual effects into a respective ultra-far peripheral horizontal static field of at least one of the eyes can include presenting the generated visual effects into a respective ultra-far peripheral horizontal static field of at least one of the eyes which respective ultra-far peripheral horizontal static field extends rearwardly from the fovea centralis of the respective eye in the straight ahead static gaze direction to 110 degrees or more rearwardly from the fovea centralis of the respective eye.

The method can further include: providing a view of a real world environment in a foveal vision field of the user without the aid of any image generator or display.

The method can further: generating, by at least one image generator, a number of images; and providing, via the at least one optic, the number of images in a foveal vision field of the user. The at least one optic can provide the images with focusing or without focusing. Additionally or alternatively, the at least one optic can provide the images with polarization or without polarization.

The method can further include: sensing, by at least one sensor, to sense at least one physical trait of the user of the device; and adjusting the generation of the images based on the physical characteristics sensed by the at least one sensor.

The method can further include: adjusting an angle at which the images are presented into the respective peripheral field of vision of at least one of two eyes of the user of the device.

Presenting the generated visual effects into a respective ultra-far peripheral horizontal static field of at least one of the eyes can include presenting visually-inconspicuously the generated visual effects into a respective ultra-far peripheral horizontal static field of at least one of the eyes such that the visual effects are not processed by a primary visual cortex.

Successively generating a plurality of visual effects that are non-contextual with respect to content appearing in a central field of vision of at least one of the eyes can include successively generating the visual effects in an IR range of an electromagnetic spectrum.

The at least one visual effects generator is operable to successively generate a plurality of visual effects to treat or improve one or more of: traumatic brain injury; acuity, focus, visual convergence, visual sustainability, visual processing, visual field, retinal health, brain field health, visual discrimination, visual spatial memory, ocular motility, pursuits and saccades, hold fixation, convergence/divergence, eye alignment, depth perception, Phorias, occipital cortex, blink rate, digital eye strain, dry eyes, pain, migraine headaches, and/or balance, for example of a wearer of a head worn device.

A device for use with a user having a pair of eyes can be summarized as including: at least one visual effects generator; at least one optic optically coupled to the at least one visual effects generator; and at least one processor communicatively coupled to the at least one visual effects generator, and operable to perform any of the methods described herein.

A device for use with a user having a pair of eyes can be summarized as including: at least one visual effects generator operable to successively generate a plurality of visual effects that are non-contextual with respect to content appearing in a central field of vision of at least one of the eyes and wherein the visual effects do not constitute a cursor, a user input field or other user input or control user interface element; and at least one optic optically coupled to the at least one visual effects generator and positioned and oriented to present the generated visual effects at least in a respective ultra-far peripheral horizontal static field of at least one of at least one of two eyes of a user of the device, the ultra-far peripheral horizontal static field of each eye which extends rearwardly from a fovea centralis (e.g., perpendicular that extends forwardly of a pupil) of the respective eye in a straight ahead static gaze direction to at least 100 degrees to 110 degrees or more rearwardly from the fovea centralis of the respective eye.

The at least one visual effects generator can be operable to successively generate a plurality of random visual effects. The at least one visual effects generator can be operable to successively generate the plurality of visual effects based at least in part on a task to be performed by the user. The at least one visual effects generator can be operable to successively generate the plurality of visual effects based at least in part on a treatment to be performed on the user. At least one image generator can be operable to successively generate a plurality of images and the at least one optic is optically coupled to the at least one image generator and positioned and oriented to present the generated images at least in a respective central field of vision of at least one of the eyes. The at least one visual effects generator can be operable to successively generate a plurality of visual effects that are independent of content appearing in a central field of vision of at least one of the eyes.

The at least one optic can be positioned and oriented to present the generated visual effects into a respective ultra-far peripheral horizontal static field and into a far peripheral horizontal static field of at least one of the eyes which respective ultra-far peripheral horizontal static field extends rearwardly from the fovea centralis of the respective eye in the straight ahead static gaze direction to 100 degrees or more rearwardly from the fovea centralis of the respective eye and which respective far peripheral horizontal static field extends rearwardly from the fovea centralis of the respective eye in the straight ahead static gaze direction to 60 degrees or more rearwardly from the fovea centralis of the respective eye. The at least one optic can be positioned and oriented to present the generated visual effects into a respective ultra-far peripheral horizontal static field and into a far peripheral horizontal static field of at least one of the eyes which respective ultra-far peripheral horizontal static field extends rearwardly from the fovea centralis of the respective eye in the straight ahead static gaze direction to 110 degrees or more rearwardly from the fovea centralis of the respective eye and which far peripheral horizontal static field extends rearwardly from the fovea centralis of the respective eye in the straight ahead static gaze direction to 60 degrees or more rearwardly from the fovea centralis of the respective eye. The at least one optic can be positioned and oriented to present the generated visual effects into a respective ultra-far peripheral horizontal static field of at least one of the eyes which respective peripheral horizontal static field extends rearwardly from the fovea centralis of the respective eye in the straight ahead static gaze direction to 110 degrees or more rearwardly from the fovea centralis of the respective eye. The at least one optic can be positioned and oriented to present the generated visual effects into a respective ultra-far and a respective far peripheral horizontal static fields of at least one of the eyes which respective far peripheral horizontal static field extends rearwardly from the fovea centralis of the respective eye in the straight ahead static gaze direction to 60 degrees or more rearwardly from the fovea centralis of the respective eye.

The device can be a head worn device, and can further include: a front eyeglasses frame; a first arm that extends rearwardly from a first side of the front eyeglass frame; and a second arm that extends rearwardly from a second side of the front eyeglass frame.

The at least one optic can include a first optic carried by the first arm and a second optic carried by the second arm. The first optic can, for example, be one of a first reflector, a first dichroic mirror or a first prism and the second optic is one of a second reflector, a second dichroic mirror or a second prism.

The at least a portion of the first arm can be transparent and positioned to a side of a first one of the two eyes when the head worn device is worn and at least a portion of the second arm can be transparent positioned to a side of a second one of the two eyes when the head worn device is worn.

The device can provide a view of a real world environment in a foveal vision field of the user of the device without the aid of any image generator or display.

The at least one optic can be optically coupled to the at least one image generator to provide a number of images in a foveal vision field of the user of the device. The at least one optic can provide the images with focusing or without focusing. Additionally or alternatively, the at least one optic can provide the images with polarization or without polarization.

The device can further include: at least one sensor operable to sense at least one physical trait of the user of the device; and at least one processor-based system communicatively coupleable to the at least one sensor and operable to adjust the generation of the images based on the physical characteristics sensed by the at least one sensor. The at least one sensor can be operable to sense at least one physical trait including any one or more of: acuity, focus, blink rate, myopia, convergence, sustainability, visual processing, visual field, retinal health, brain field health, visual discrimination, visual spatial memory, ocular motility, pursuits and saccades, hold fixation, convergence/divergence, eye alignment, depth perception, phorias, and/or occipital cortex.

The at least one processor-based system can be operable to adjust an angle at which the images are presented into the respective peripheral field of vision of at least one of two eyes of the user of the device.

The at least one optic can be positioned and oriented to visually-inconspicuously present the generated visual effects into a respective ultra-far peripheral horizontal static field of at least one of the eyes such that the visual effects are not processed by a primary visual cortex.

The generator can generate the visual effects in an IR range of an electromagnetic spectrum.

The device can further include: one or more bone conduction audio transducers, posture neck vibrators and/or heart rate monitors.

The device can be is a head worn device.

The at least one visual effects generator can be operable to successively generate a plurality of visual effects to treat or improve one or more of: traumatic brain injury; acuity, focus, visual convergence, visual sustainability, visual processing, visual field, retinal health, brain field health, visual discrimination, visual spatial memory, ocular motility, pursuits and saccades, hold fixation, convergence/divergence, eye alignment, depth perception, Phorias, occipital cortex, blink rate, pain, migraine headaches, and/or balance of the user (e.g., wearer of a head worn device).

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
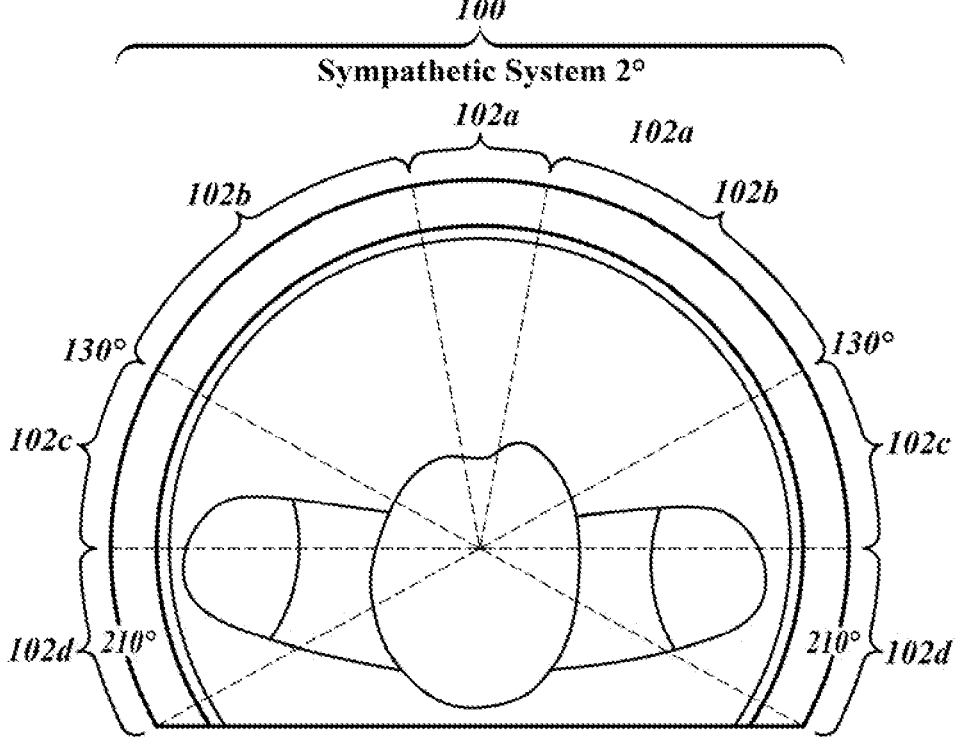
FIG. 1 is a schematic view of fields of vision relative to a human having a pair of eyes.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with displays, projectors, virtual reality (VR), augmented reality (VR), computers, processors, memory and other storage media, and communications such as wired and wireless communication ports and wireless radios (i.e., transmitters, receivers or transceivers), have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one implementation" or "an implementation" or to "one embodiment" or "an embodiment" means that a particular feature, structure or characteristic described in connection with the implementation or embodiment is included in at least one implementation or embodiment. Thus, the appearances of the phrases "in one implementation" or "in an implementation" or "in one embodiment" or "in an embodiment" in various places throughout this specification are not necessarily all referring to the same implementation or embodiment. Furthermore, the particular features, structures, or characteristics may be combined in any suitable manner in one or more implementations or embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Several terms used in this application are set out below to provide background for the reader. While explanations of those terms are provided, those terms should be interpreted as one of ordinary skill in the field of ophthalmology would understand those terms.

Acquired/Traumatic brain injury (ABI/TBI)—trauma to the brain, either internal or external in nature, resulting in injury/impairment.

Accommodation—An ability of the eye's lens to change shape to focus of eyes to achieve and maintain clarity. Research shows near-far focusing skills can be improved with vision training.

Amblyopia—The inability to achieve a normal level of visual acuity while using the best glasses and/or contacts. Also called "lazy eye," amblyopia is a vision development problem in which an eye fails to attain normal visual acuity, usually due to strabismus or other binocular vision problems. Specially designed video games are a recent form of vision therapy being shown to improve visual development among children with amblyopia. It is an eye that has reduced vision that is not correctable by wearing corrective lenses.

Astigmatism—Results in blurry or double vision at any distance. May be accompanied by nearsightedness or farsightedness.

Attention Deficit Hyperactivity Disorder (ADHD)—ADHD symptoms can mimic the symptoms caused by a vision condition called convergence insufficiency. As a result, many children are misdiagnosed with ADHD, causing unnecessary negative stigmas and low self-esteem.

Balance—The sense of relation to gravity, via a combination of proprioceptive, vestibular and visual feedback.

Balance System—The system of mechanisms in the body that helps to maintain balance.

Binocular—Of or involving both eyes at once. The use of both eyes simultaneously in such a manner that each retinal image contributes to the final perception.

Binocularity (eye teaming)—How well the brain processes and integrates information from both left and right eyes. The ability to use both eyes together effectively. The coordination of the eyes to work together efficiently and effectively.

Binocular Depth Perception—A result of successful eye teaming and stereoscopic vision; the ability to visually perceive three dimensional space; the ability to visually judge relative distances between objects; a visual-motor skill that aids accurate movement in three-dimensional space.

Binocular Vision—Vision as a result of both eyes working as a team; when both eyes work together smoothly, accurately, equally and simultaneously.

Binocular Vision Problems—Subtle eye alignment problems called Phorias (esophoria) that may not produce a visible eye turn but still can cause eye strain and eye fatigue when reading also can be minimized or corrected with vision therapy.

Binocular Vision impairment—A visual condition in which the two eyes fail to work together as a coordinated team, resulting in a partial or total loss of binocular depth perception and stereoscopic vision. At least 12 percent of the population has some type of binocular vision impairment. Amblyopia and strabismus are the most common types of binocular vision impairment.

Carsick Syndrome—Poor flexibility between vestibular and visual information processing, typically leading to discomfort in the form of dizziness, nausea and/or headaches.

Center of Gravity (COG)—The point in the body on which gravity can be modeled as acting upon. This point changes based on position and activity.

Central/Peripheral Awareness—Ability to process and integrate central and peripheral visual information simultaneously.

Collic—Referring to the neck.

Convergence—The ability to bring eyes inward or closer or the inward movement of the eyes when looking at an object close to the face.

Convergence Insufficiency—The inability to bring eyes sufficiently inward or closer.

Crowding phenomenon—Poor ability to track or process visual information (typically text) when the target is surrounded by a cluttered or busy visual environment.

Divergence—The ability to move eyes outward or further, or the outward movement of the eyes when looking at an object far away.

Digital Eye Strain (DES) (also called Computer Vision Syndrome (CVS))—A condition that results from prolonged usage of digital devices having electronic screens (e.g., computers, tablet computers, and smartphones). Digital eye strain can cause sore or tired eyes, eye strain, blurry vision, dry eyes, headaches, incomplete, partial or "half" blinking, and even neck or shoulder pain. Digital eye strain is often caused by the glare, flicker, and other visual distractions that are common on display screens, as well as the demands placed on the eyes and visual system when using digital devices with such screens for extended periods of time. The condition is best treated with vision therapy and specific behavioral changes.

Diplopia or Double Vision—A condition in which a single image appears double.

Directionality—The ability to consistently and correctly relate left and right, top and bottom, clockwise and counterclockwise manner and be able to continue properly in tasks which depend upon direction. The ability to project the internal awareness of the two sides of the body, the spatial world of the individual.

Disequilibrium—Unsteadiness, imbalance, or loss of equilibrium. Often accompanied by spatial disorientation (a sensation of not knowing where one's body is in relation to the vertical and horizontal planes).

Dizzy—overwhelming vestibular and/or visual information leading to a poor sense of balance.

Dry Eyes—A common condition that results from insufficient tear quantity, or inadequate tear quality. Dry eyes can range from a mild inconvenience to a chronic problem, and cause many uncomfortable symptoms that can impact performance of daily activities. There are many different treatments for dry eyes, depending on the severity of the condition.

Dyslexia—A 20/20 vision test only evaluates visual acuity at a distance of 20 feet. A person can pass this vision test and still have serious vision problems. Similarly, the standard hearing test only looks for hearing loss, but does not test for other auditory processing abnormalities. Dr. Livingstone's research on developmental dyslexia also showed that, "Visual abnormalities were reported to be found in more than 75% of the reading-disabled children tested." This statement was made about reading-disabled children, not dyslexic children—emphasizing that testing for dyslexia must include a multi-disciplinary approach, and a thorough evaluation of the child's sensory function and integration.

Esotropia—An eye that turns in; the over-converging of one eye relative to the desired fixation point.

Exotropia—An eye that turns out; the over-relaxing of extraocular muscles, leading to a resting position beyond parallel

Extinction—The ability to attend to one part of the visual field and another part of the visual field one at a time but cannot see it simultaneously.

Eye Conditions—Conditions that affect the eyes and cause a range of symptoms, from a minor inconvenience to permanent blindness. The most common eye conditions include: cataracts, glaucoma, diabetic retinopathy, macular degeneration, corneal diseases, ocular oncology, Pterygium and Pinguecula.

Eye-hand coordination—The ability to coordinate the movements of the eyes and hands in order to perform a specific task or activity. This type of coordination is essential for activities that require precise and accurate movements, such as writing, drawing, and playing sports.

Eye Movement Disorders—Studies have shown vision therapy can improve the accuracy of eye movements used during reading and other close-up work.

Eye Teaming—The ability of both eyes to point at the same object at the same time.

Eye Tracking—The ability to move the eyes smoothly and accurately to simultaneously and smoothly follow words on a page or moving objects in space or fixate on a stationary object.

Eyestrain—Familiar symptoms of eyestrain include: headache, brow-ache, eye fatigue, pulling sensation, crossed eyes, wall eye (Strabismus), and lazy eye (Amblyopia).

Farsightedness—Farsightedness, or hyperopia, is the opposite of nearsightedness. Blurry vision when you look at close up objects. Near and far objects may both look fuzzy. Also called hyperopia.

Fixation—the ability to maintain steady or accurate gaze on a visual point.

Focus—The ability to change focus quickly from distance to near or near to distance without experiencing blurry vision.

Fusion—Ability to lock together left and right eyes images to combine the images from the left and right eyes into a single, three-dimensional image.

Gait—the manner in which one walks.

Homeostasis—The balance between the two nervous systems, Sympathetic Nervous System (SNS) and Parasympathetic Nervous System (PNS). At each target organ, dual innervation determines activity. For example, the heart receives connections from both the sympathetic and parasympathetic divisions. SNS stimulation causes the heart rate to increase, whereas PNS stimulation causes the heart rate to decrease.

Hyperopia—Also known as long-sightedness, or far-sightedness. This condition causes near objects or images to appear blurry or out of focus.

Intermittent—Occasionally happening, not constant.

Intraocular—Of or related to the inside of an eye.

Just noticeable differences (JND)—The amount of change necessary for one to be able to perceive a difference.

Laterality—The ability to consistently and correctly understand one's left and right, top and bottom, front and back. The internal awareness and integration of the two sides of the body.

Legal blindness—When vision in both eyes cannot be corrected to better than 20/200, or when there is a visual field of 20 degrees or less.

Low vision—Either legally blind or have visual acuity between 20/70 and 20/200, despite the use of glasses or contacts.

Monocular—Having or relating to one eye.

Myopia—When it's difficult to see objects in the distance while near objects are seen more clearly. Also called nearsightedness. Myopia is a refractive error, the physical cause of myopia is comparable to any optical system that is out of focus. Axial myopia is attributed to an increase in the eye's axial length. Refractive myopia is attributed to the condition of the refractive elements of the eye. Curvature myopia is attributed to excessive, or increased, curvature of one or more of the refractive surfaces of the eye, especially the cornea. In those with Cohen syndrome, myopia appears to result from high corneal and lenticular power. Index myopia is attributed to variation in the index of refraction of one or more of the ocular media.

Nearsightedness—Nearsightedness, or myopia, affects nearly half of the population and the problem is growing. It is the result of images being focused in front of the retina rather than on it, so distant objects appear blurred.

Night Blindness—It's hard to see objects in dim light.

Nyctalopia—See night blindness.

Nystagmus—The eye moves or "jiggles" all the time on its own.

Occupational Therapy—In general, occupational therapy fosters hand-eye coordination by enhancing the neural pathways that integrate visual information with hand movements, and strengthening the muscles in the eyes and hands.

Oculomotor skills—The ability to move the eyes accurately and smoothly to fixate on and follow objects.

Presbyopia—When the eye can no longer change focus to see objects close up. It is not a disease, but a part of the eye's natural aging process. It affects everyone at some point in life. It usually shows up around age 40 to 45. Presbyopia is blurred vision at a normal reading distance in someone with otherwise normal distance vision (with or without glasses). It occurs when the eye develops insufficient focusing power for reading and other near tasks.

Proprioception—The ability to sense the position, orientation, and movement of the body in space. This ability is provided by sensory receptors in the muscles, tendons, and joints, which provide information about the position, orientation, and movement of the body to the brain. Proprioception is an important aspect of overall body awareness and movement control, and useful for activities that require precise and accurate movements, such as sports, dance, and other physical activities. Proprioception can be improved through training and practice, and is an important aspect of overall physical function and performance.

Pursuits—the ability to smoothly and consistently follow a moving target.

Ophthalmologist—A physician who specializes in the medical and surgical care of the eyes and visual systems, and in the prevention of eye disease and injury.

Orthoptic Therapy—A small part or limited form of vision therapy which trains convergence (eye teaming) skills and visual acuity only. A non-surgical or post-surgical treatment, it is typically home-based.

Parasympathetic recovery techniques—Methods or practices that are designed to help individuals recover from the effects of stress and anxiety by activating the parasympathetic nervous system. The parasympathetic nervous system is part of the autonomic nervous system, and is responsible for regulating the body's own "rest and digest" functions, such as slowing the heart rate and increasing blood flow to the digestive organs. Parasympathetic recovery techniques can include a wide range of practices, such as breathing exercises, meditation, yoga, and other relaxation techniques. These techniques can help individuals reduce stress and improve their overall well-being by promoting the body's natural ability to recover and repair itself. Such can, for example, be used to address parasympathetic overtraining which is associated with high volumes of aerobic activity (e.g., long-distance running, rowing, Nordic skiing, bicycling). Symptoms of parasympathetic overtraining include depression and decreased heart rate, feeling of fatigue and decreased performance. Such contrasts with sympathetic overtraining which is connected with high amounts of anaerobic activity and in general occurs in sports where anaerobic energy mechanism is dominant (e.g., Mixed Martial Arts, boxing, basketball, American football, tennis, and short distance in athletics).

Perceptual Skills—Visual memory, visual discrimination, spatial relationships, visual closure, visual/auditory integration, visual motor integration, directionality, laterality, and bilaterality are all examples of perceptual skills.

Phoria—A phoria is a misalignment of the eyes that only appears when binocular viewing is broken and the two eyes are no longer looking at the same object. The misalignment of the eyes starts to appear when a person is tired, therefore it is not present all of the time. Eye doctors categorize phorias and tropias by direction. Exotropia or exophoria: An eye turns outward. Esotropia or esophoria: An eye turns inward. Hypertropia or hyperphoria: An eye turns upward. Hypotropia or hypophoria: An eye turns downward. Eye doctors also categorize them as right eye or left eye or alternating between the eyes. They can also be labeled intermittent or constant. Misalignment of the eyes may also be the result of the following: Birth trauma; Brain injury, cerebral palsy; Congenital mal-development; or Neurologic problems.

Refractive error—Undiagnosed need for glasses in one or both eyes.

Saccades—the ability to move the eyes rapidly from one fixation point to another.

Spatial localization—How accurately one can judge distance and specific location within space.

Spatial awareness—The ability to perceive and understand the spatial relationships between objects and the environment. This includes the ability to perceive the position, orientation, and movement of objects, as well as the ability to navigate and move through space. Spatial awareness is an important cognitive ability for a wide range of activities, including navigation, sports, and other activities that require the integration of visual information with movements of the body. Spatial awareness can be improved through training and practice, and is an important aspect of overall cognitive function and performance Sports vision training—A type of training that focuses on improving the visual skills and abilities that are important for successful performance in sports. This type of training typically includes activities and exercises that help athletes develop and improve their visual acuity, eye tracking, eye teaming, depth perception, and other visual skills that are essential for success in sports. Sports vision training can be used to help athletes of all ages and skill levels improve their visual performance, and is often an important part of a comprehensive training program for athletes who want to achieve their goals in sports.

Stereopsis (aka stereoscopic vision)—Ability to interpret and perceive depth via the process of combining left and right eye images. A byproduct of good binocular vision; vision wherein the separate images from two eyes are successfully combined into one three-dimensional image in the brain.

Strabismus (or crossed eyes)—Strabismus is a disorder in which both eyes do not line up in the same direction or aim together. Therefore, they do not look at the same object at the same time. The most common form of strabismus is known as "crossed eyes." The success of vision therapy for strabismus depends on the direction, magnitude and frequency of the eye turn. Vision therapy has been proven effective for treating an intermittent form of strabismus called convergence insufficiency, which is a failure to keep the eyes properly aligned when reading despite appropriate alignment when looking at distant objects.

Suppression—The brain's ability to disregard or ignore information from one eye.

Sympathetic/parasympathetic systems—Nervous system reactions regulating stress and ability to rest.

Tropia—A misalignment of the eyes that is always present. Even when the eyes are both open and trying to work together, large angle misalignments are apparent.

Tunnel vision—When peripheral, vision is gone. Conditions like retinitis pigmentosa and untreated glaucoma can cause tunnel vision.

Vergence—Ability to aim eyes together nearer and further accurately.

Vestibulo Ocular Reflex (VOR)—The ability for the brain to register movement via a shift in the vestibular system and subsequently move eyes opposite the motion of the head in order to maintain steady visual fixation. VOR is a reflex that helps maintain clear and stable vision during head movements, and is mediated by the vestibular system (located in the inner ear), and involves the coordination of eye movements with head movements. When the head moves, the vestibular system sends signals to the oculomotor system, which controls the movements of the eyes. The oculomotor system adjusts the movements of the eyes in order to maintain a stable visual image on the retina. This helps to prevent blurred vision and other visual disturbances that can occur during head movements. VOR is an important aspect of overall visual function and is essential for activities that require stable vision, such as reading, driving, and sports.

Vision-body coordination—The ability to coordinate the movements of the eyes with the movements of the body as a whole. This type of coordination is important for activities that require the integration of visual information with body movements, such as walking, running, and other types of physical activity. Together, eye-hand and vision-body coordination are important for a wide range of activities that require the integration of visual information and movements of the eyes, hands, and body.

Visual Acuity—The ability to see things at a given distance. How clearly one can see with or without correction at near and distance targets.

Visual attention—Ability to achieve and maintain attention on one or more visual targets.

Visual/Auditory Integration—The ability to match auditory and visual stimuli in the brain.

Visual awareness—the general sense of awareness of what is being seen through the visual system.

Visual Closure—The ability to recognize familiar figures that are partially obscured or removed.

Visual Discrimination—The ability to see the similarities and differences in shapes, forms, objects, letters, words, etc.

Visual field—the area of visual information that can be seen.

Visual inattention (neglect)—the inability for the brain to register or attend to visual information, typically within a specific side or portion of a visual field.

Visual Motor Integration—The ability to match visual and motor skills in the brain, such as copying a series of pictures or forms.

Visual Motor skills—The ability to coordinate eye movements with hand and body movements.

Visual Memory—The ability to remember what has been seen, without relying on subvocalization, tactile, or auditory feedback. The act of forming a mental visual image of something seen before or visualized.

Visual perception/Visual perception skills—The ability to interpret and understand visual information from the environment.

Visual rehabilitation—The process of re-learning and re-integrating visual skills after a traumatic event in which visual skills become impaired.

Visual sensory-motor integration—Ability to process visual information with the intent to guide motor movements.

Visual Space Orientation—The ability of the eyes and brain to work together to perceive relative positions of objects in the visual field.

Visual stress/Relaxation—physical/mental/emotional response to visual input.

Vision Therapy (also known as vision training, visual therapy, visual training)—Supervised therapy involving procedures (eye exercises) which are aimed at improving visual skills such as eye teaming, binocular coordination and depth perception, focusing, acuity (clarity of sight), and "hand-eye" or "vision-body" coordination.

Described herein are apparatus and methods for use with a user or human subject having a pair of eyes, which advantageously employ at least one visual effects generator operable to successively generate a plurality of visual effects that are non-contextual with respect to content appearing in a central field of vision of at least one of the eyes and wherein the visual effects do not constitute a cursor, a user input field or other user input or control user interface element; and at least one optic optically coupled to the at least one visual effects generator and positioned and oriented to present the generated visual effects at least in a respective ultra-far peripheral horizontal static field of at least one of each of two eyes of a user of the device, the ultra-far peripheral horizontal static field of each eye which extends rearwardly from a fovea centralis (e.g., perpendicular that extends forwardly of a pupil) of the respective eye in a straight ahead static gaze direction to at least 200 degrees or more rearwardly from the fovea centralis of the respective eye. Such can be used to, for example, to treat or improve one or more of: traumatic brain injury; acuity, focus, visual convergence, visual sustainability, visual processing, visual field, retinal health, brain field health, visual discrimination, visual spatial memory, ocular motility, pursuits and saccades, hold fixation, convergence/divergence, eye alignment, depth perception, Phorias, occipital cortex, blink rate, pain, migraine headaches, and/or balance of the user or human subject.

FIG. 1 shows fields of vision 100 relative to a human 102 having a pair of eyes.

The fields of vision 100 can be divided into a sympathetic portion 102a that generally triggers or is handled by the sympathetic system of the body, and peripheral portions 102b, 102c, 102d that are considered peripheral to the sympathetic portion 102a.

Figure 2:
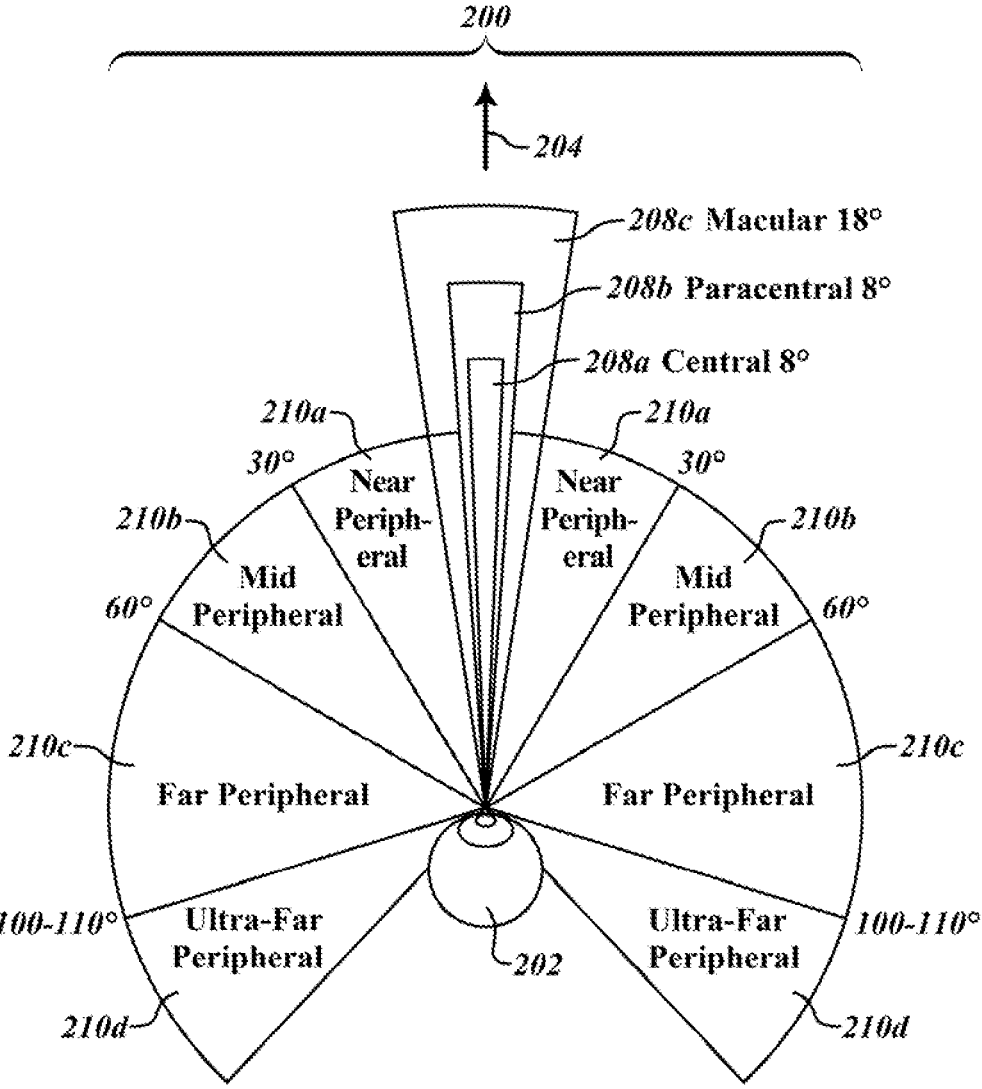
FIG. 2 is a schematic view of fields of vision relative to a human eye, according to the present disclosure.

FIG. 2 shows fields of vision 200 relative to a human eye 202.

The fields of vision 200 are generally illustrated as described with respect to a fovea centralis 204 (i.e., optical axis, e.g., perpendicular that extends forwardly of a pupil 206) of the respective eye, in a straight ahead static gaze direction of the human eye 202. While the human eye 202 can and does rotate in use, the fovea centralis 204 that extends forwardly in the straight ahead static gaze direction provides a reference frame for describing the various fields of vision 200.

The fields of vision 200 generally has a set of central vision fields and a set of peripheral vision fields. The central vision fields can be considered as comprised of a central field 208a, a paracentral field 208b, and a macular field 208c. The central field 208a can be considered as a segment having an included angle of about 5° about an optical axis (i.e., fovea centralis of the respective eye, in a straight ahead static gaze direction of the human eye), the paracentral field 208b considered as a segment extending outwardly of the central field with an included angle of about 8° about the optical axis, and the macular field 208c considered as a segment extending outwardly of the paracentral field with an included angle of about 180 about the optical axis. The peripheral fields can be considered as comprised of a near peripheral field 210a, mid peripheral field 210b, far peripheral field 210c and an ultra-far peripheral field 210d. The near peripheral field 210a can be considered as a segment having an included angle of about 60° about the optical axis (i.e., fovea centralis of the respective eye, in a straight ahead static gaze direction of the human eye), the near peripheral field 210a extending rearwardly from either side of the optical axis by 30°. The mid peripheral field 210b can be considered as a segment extending outwardly of the near peripheral field 210a having an included angle of about 120° about the optical axis, the mid peripheral field 210b extending rearwardly from either side of the optical axis by 60°. The far peripheral field 210c can be considered as a segment extending outwardly of the mid peripheral field 210b having an included angle of about 2000 to 2200 about the optical axis, the far peripheral field 210c extending rearwardly from either side of the optical axis by 100° to 110°. The ultra-far peripheral field 210d can be considered as a segment extending outwardly of the far peripheral filed 210c having an included angle of greater than 1000 to 1100 about the optical axis, the far peripheral filed 210c extending rearwardly from either side of the optical axis by more than 1000 or more than 110°. The angle off of the optical axis is typically referred to as eccentricity.

Figure 3:
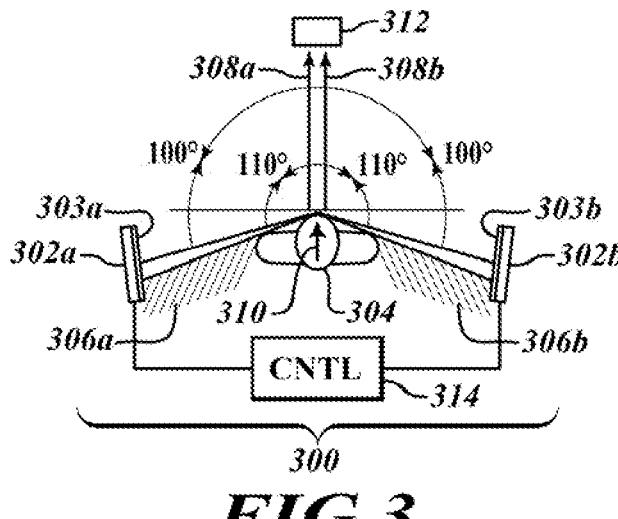
FIG. 3 is a top plan view of a system to treat aliments and/or enhance brain function via presentation of visual effects in far and/or ultra-far peripheral field including a pair of visual effects generators, showing a relative positioning and orientation of the visual effects generators with respect to a human subject, according to at least one illustrated implementation.

FIG. 3 is a top plan view of a system 300 to treat aliments and/or enhance brain function via presentation of visual effects in far and/or ultra-far peripheral field including a pair of visual effects generators 302a, 302b and sets of optics 303a, 303b, showing a relative positioning and orientation of the visual effects generators 302a, 302b with respect to a human subject 304, according to at least one illustrated implementation.

As illustrated, the visual effects generators 302a, 302b and/or optics 303a, 303b are positioned and oriented with respect to the human subject 304 to present visual effects into at least an ultra-far peripheral field of the human subject 304. That is, the visual effects generators 302a, 302b and/or and optics 303a, 303b are positioned and oriented to present visual effects into an ultra-far peripheral horizontal static field 306a, 306b of each eye which extends rearwardly from a fovea centralis 308a, 308b (e.g., perpendicular that extends forwardly of a pupil) of the respective eye in a straight ahead static gaze direction 310 to at least 100 degrees or more (e.g., greater than 110 degrees) rearwardly from the fovea centralis 308a, 308b of the respective eye of the human subject 304.

The visual effects generators 302a, 302b can take any one or more of a variety of forms. For example, the visual effects generators 302a, 302b can take the form of displays or display panels, for instance: liquid crystal displays (LCDs), light emitting diode (LED) displays, organic light emitting diode (OLED) displays, quantum dot (QLED) displays, active-matrix organic light emitting diode (AMOLED) displays, plasma displays, field emission displays, electronic paper (e-paper) displays, digital light processing (DLP) displays, cathode ray tubes (CRTs) displays. Also for example, the visual effects generators 302a, 302b can take the form of projectors, for instance: digital light processing (DPL) projectors, liquid crystal display (LCD) projectors, light emitting diode (LED) projectors, organic light emitting diode (OLED) projectors, liquid crystal on silicon (LCoS) projectors, and laser projectors. As yet a further example, the visual effects generators 302a, 302b can take the form of one or more mechanical devices, for instance a ball on a track that moves back and forth, a pendulum or metronome, a tube or drum with markings (e.g., spiral or helical lines like a barber pole) on an outer circumference of the tube or drum that spins or rotates or pivots (e.g., about an vertical axis), for instance a e.g., optokinetic drum, each of the mechanical devices which is positioned and oriented to appear in at least the ultra-far peripheral horizontal static field of at least one of each of two eyes of a user.

The optics 303a, 303b can take any one or more of a large variety of forms, for instance: one or more transparent planar sheets or windows, lenses with a non-zero focal power (e.g., planoconvex lens, biconvex lens, planoconcave lens, biconcave lens, meniscus lens, cylindrical lens, aspheric lens), reflectors, mirrors, dichroic mirrors, prisms, gratings, filters, refractors, diffusers, diffractors, polarizers, holographic optical elements and/or collimators. One or more optics 303a, 303b can define an optical path that directs visual effects from the visual effects generators 302a, 302b to the far and/or ultra-far peripheral field of the user.

As illustrated in FIG. 3, the human subject 304 may have a view of the real world which is represented as one or more objects 312. The real world and/or object(s) 312 can have a respective subject matter and/or context (e.g., the circumstances that form the setting for an event, statement, or idea, and in terms of which it can be fully understood and assessed). For example, the real world and/or object(s) 312 can be a book, newspaper, magazine, chalkboard, white board, lecture, seminar, training event, sports event, a theatrical production, children at play or adults at work or leisure. The real world and/or object(s) 312 may require concentration by the human subject in order to comprehend the subject matter. In short, the real world may, for example, encompass a real world view of any activity that requires a user to focus and enter a state of "tunnel vision" for extended periods of time. Going into this "tunnel vision" and sympathetic state from central vision state is relatively easy for some people. A lot of activities make people enter a state of "tunnel vision" (e.g., jewelry making, drawing, video games, sports). Using peripheral vision and engaging the parasympathetic system requires effort, awareness, and training. A balance between the two systems is often need and is currently out of balance in many people's daily lives.

The system 300 can include a control subsystem 314 communicatively coupled to control the visual effects generators 302a, 302b. The control subsystem 314 can, for example, take the form of a processor based control subsystem (e.g., control subsystem 714 illustrated and described with reference to FIG. 7 below), which provides signals that cause the visual effects generators 302a, 302b to present visual effects in at least the ultra-far peripheral horizontal static field of at least one of each of two eyes of a user who is positioned and oriented as a defined location relative to the visual effects generators 302a, 302b. The control subsystem 314 can be communicatively coupled to the visual effects generators 302a, 302b via a cable or wire, wirelessly via a radio (RF, microwave), or optically via an IR transmitter and receiver pair or via optical fiber with a transmitter and receiver pair.

In operation, the control subsystem 314 can provide signals that cause the visual effects generators 302a, 302b to present visual effects. In some implementations, the control subsystem 314 can determine not only when to present visual effects, but can also determine the particular type and/or visual characteristics of visual effects that will be provided. In other implementations, the control subsystem 314 only determines when to present visual effects, and the particular type and/or visual characteristics of visual effects are either pre-set or are determined by the visual effects generators 302a, 302b. In some implementations, for example where the visual effects generators 302a, 302b are mechanical, the control subsystem 314 only determines when to present visual effects, providing a simple ON/OFF signal or even a prompt to a human to turn the visual effects generators 302a, 302b ON/OFF. Notably, where the visual effects generators 302a, 302b are mechanical, the control subsystem 314 can be omitted. Where the visual effects generators 302a, 302b are mechanical, there may be relatively simple or basic input elements, e.g., a dial or keys to set or select speed, a dial or keys to set or select wait time or duration between repetitions (e.g., repetitions back and forth, for example on a long enough cycle that any pattern is not typically perceptible to a user), with possibly some level of randomness in the generation of the visual effects.

The plurality of visual effects are preferably non-contextual with respect to content appearing in a central field of vision of at least one of the eyes, for example non-contextual with respect to the real world or object(s) 312. That is the visual effects either have no context (e.g., pattern of lines, dots, other geometric shapes, and/or movement that provides or encodes no information) or a context that is unrelated with the context of any content in a central visual field of the user (e.g., real world or object(s) 312). The plurality of visual effects preferably do not constitute a cursor, a user input field or other user input or control user interface element. The visual effects can change over time, for example changing randomly or changing between a set of defined visual effects over a sufficiently long time period that the human subject does not detected or perceive a repeating pattern.

The visual effects can be independent of any content appearing in a central field of vision of at least one of the eyes. For example, the type and/or visual characteristics of the presented visual effects can be completely unrelated to any content appearing in the central field of vision of at least one of the eyes. Alternatively, the type and/or visual characteristics of the presented visual effects can be selected based on a type of activity or task being or to be performed by the human subject 304 (e.g., reading, attending a lecture, performance, jewelry making, drawing, near-work or focused detailed work) or type of object 312 (e.g., book, performance, movie, television show) appearing in the central field of vision of at least one of the eyes, while the visual characteristics of the presented visual effects still remain non-contextual with respect to the context of content appearing in the central field of vision of the user. Additionally or alternatively, the type and/or visual characteristics of the presented visual effects can be selected based on a type of treatment being or to be performed on the human subject 304.

Figure 4:
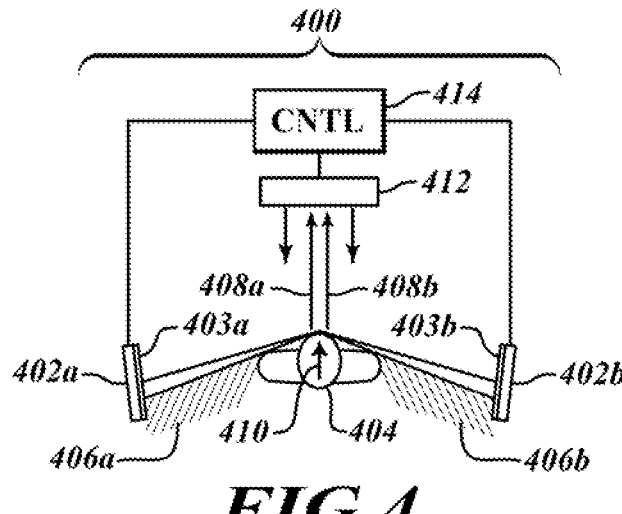
FIG. 4 is a top plan view of a system to treat aliments and/or enhance brain function via presentation of visual effects in far and/or ultra-far peripheral field including a pair of visual effects generators and a center display, showing a relative positioning and orientation of the visual effects generators and the center display with respect to a human subject, according to at least one illustrated implementation.

FIG. 4 is a top plan view of a system 400 to treat aliments and/or enhance brain function via presentation of visual effects in far and/or ultra-far peripheral field including a pair of visual effects generators 402a, 402b, sets of optics 403a, 403b and one or more center image generators 412, showing a relative positioning and orientation of the visual effects generators 402a, 402b, sets of optics 403a, 403b and the center image generator(s) 412 with respect to a human subject, according to at least one illustrated implementation.

As illustrated, the visual effects generators 402a, 402b and/or the sets of optics 403a, 403b are positioned and oriented with respect to the human subject 404 to present visual effects into at least an ultra-far peripheral field of the human subject 404. That is, the visual effects generators 402a, 402b and/or the sets of optics 403a, 403b are positioned and oriented to present visual effects into an ultra-far peripheral horizontal static field 406a, 406b of each eye which extends rearwardly from a fovea centralis 408a, 408b in a straight ahead static gaze direction 410 to at least 100 degrees or more (e.g., greater than 110 degrees) rearwardly from the fovea centralis 408a, 408b of the respective eye of the human subject 404.

The visual effects generators 402a, 402b can take any one or more of a variety of forms. For example, the visual effects generators 402a, 402b can take the form of displays or display panels, for instance: liquid crystal displays (LCDs), light emitting diode (LED) displays, organic light emitting diode (OLED) displays, quantum dot (QLED) displays, active-matrix organic light emitting diode (AMOLED) displays, plasma displays, field emission displays, electronic paper (e-paper) displays, digital light processing (DLP) displays, cathode ray tubes (CRTs) displays. Also for example, the visual effects generators 402a, 402b can take the form of projectors, for instance: digital light processing (DPL) projectors, liquid crystal display (LCD) projectors, organic light emitting diode (OLED) projectors, light emitting diode (LED) projectors, liquid crystal on silicon (LCoS) projectors, and laser projectors. As yet a further example, the visual effects generators 402a, 402b can take the form of one or more mechanical devices, for instance a ball on a track that moves back and forth, a pendulum or metronome, a tube or drum with markings (e.g., spiral or helical lines like a barber pole) on an outer circumference of the tube or drum that spins or rotates or pivots (e.g., about an vertical axis), for instance a e.g., optokinetic drum, each of the mechanical devices which is positioned and oriented to appear in at least the ultra-far peripheral horizontal static field of at least one of each of two eyes of a user.

The optics 403a, 403b can take any one or more of a large variety of forms, for instance: one or more transparent planar sheets or windows, lenses with a non-zero focal power (e.g., planoconvex lens, biconvex lens, planoconcave lens, biconcave lens, meniscus lens, cylindrical lens, aspheric lens), reflectors, mirrors, dichroic mirrors, prisms, gratings, filters, refractors, diffusers, diffractors, polarizers, holographic optical elements and/or collimators. One or more optics 403a, 403b can define an optical path that directs visual effects from the visual effects generators 402a, 402b to the far and/or ultra-far peripheral field of the user.

As illustrated in FIG. 4, the system 400 may have one or more center image generators 412. The center image generator(s) 412 is positioned and oriented to present images in the center vision field of the subject human 404, for instance when the subject human 404 is correctly positioned and oriented with respect to the system 400. The center image generator(s) 412 can take any one or more of a variety of forms. For example, the center image generator(s) 412 can take the form of displays or display panels, for instance: liquid crystal displays (LCDs), light emitting diode (LED)

displays, organic light emitting diode (OLED) displays, quantum dot (QLED) displays, active-matrix organic light emitting diode (AMOLED) displays, plasma displays, field emission displays, electronic paper (e-paper) displays, digital light processing (DLP) displays, cathode ray tubes (CRTs) displays. Also for example, the center image generator(s) 412 can take the form of projectors, for instance: digital light processing (DPL) projectors, liquid crystal display (LCD) projectors, organic light emitting diode (OLED) projectors, light emitting diode (LED) projectors, liquid crystal on silicon (LCoS) projectors, and laser projectors, or a screen onto which the projector(s) project images.

The center image generator 412 can present images that have a respective subject matter and/or context (e.g., the circumstances that form the setting for an event, statement, or idea, and in terms of which it can be fully understood and assessed). For example, the image generator 412 can present a visual or audiovisual presentation, lesson, lecture, seminar, training session, broadcast, newscast, book reading, movie, sports event, theatrical production, a virtual book, virtual newspaper, virtual magazine, periodical, video games, smartphone or tablet computer. The content presented via the center image generator(s) 412 may require concentration by the human subject in order to comprehend the subject matter.

The system 400 can include a control subsystem 414 communicatively coupled to control the visual effects generators 402a, 402b and the center image generator(s) 412. The control subsystem 414 can, for example, take the form of a processor based control subsystem (e.g., control subsystem 714 illustrated and described with reference to FIG. 7 below), which provides signals that cause the visual effects generators 402a, 402b to present visual effects in at least the ultra-far peripheral horizontal static field of at least one of each of two eyes of a user who is positioned and oriented as a defined location relative to the visual effects generators 402a, 402b. The control subsystem 414 can, for example, provide signals that cause the center image generator(s) 412 to present images in at least the central vision field of at least one of at least one of two eyes of a user who is positioned and oriented as a defined location relative to the center image generator(s) 412 and the visual effects generators 402a, 402b. The control subsystem 414 can be communicatively coupled to the center image generator(s) 412 via a cable or wire, wirelessly via a radio (RF, microwave), or optically via an IR transmitter and receiver pair or via optical fiber with a transmitter and receiver pair. Such can, for example, include virtual reality, augmented reality, mixed reality head-worn and/or extended reality (XR) systems, examples of which are described elsewhere herein.

In operation, the control subsystem 414 can provide signals that cause the visual effects generators 402a, 402b to present visual effects. The control subsystem 414 can also optionally provide signals that cause the center image generator(s) 412 to present images. In some implementations, the control subsystem 414 can determine not only when to present visual effects, but can also determine the particular type and/or visual characteristics of visual effects that will be provided. In other implementations, the control subsystem 414 only determines when to present visual effects, and the particular type and/or visual characteristics of visual effects are either pre-set or are determined by the visual effects generators 402a, 402b. In some implementations, for example where the visual effects generators 402a, 402b are mechanical, the control subsystem 414 only determines when to present visual effects, providing a simple ON/OFF signal or even a prompt to a human to turn the visual effects generators 402a, 402b ON/OFF. Notably, where the visual effects generators 402a, 402b are mechanical, the control subsystem 414 can be omitted.

The plurality of visual effects are preferably non-contextual with respect to content appearing in a central field of vision of at least one of the eyes, for example non-contextual with respect to the images presented via the center image generator(s) 412. That is the visual effects either have no context (e.g., pattern of lines, dots, other geometric shapes, and/or movement that provides or encodes no information) or a context that is unrelated with the context of any content in a central visual field of the user (e.g., images presented by center image generator(s) 412). The plurality of visual effects preferably do not constitute a cursor, a user input field or other user input or control user interface element. The visual effects can change over time, for example changing randomly or changing between a set of defined visual effects over a sufficiently long time period that the human subject does not detect or perceive a repeating pattern.

The visual effects can be independent of any content appearing in a central field of vision of at least one of the eyes. For example, the type and/or visual characteristics of the presented visual effects can be completely unrelated to any content appearing in the central field of vision of at least one of the eyes. Alternatively, the type and/or visual characteristics of the presented visual effects can be selected based on a type of activity or task being or to be performed by the human subject 404 (e.g., reading) or object 412 (e.g., book, performance, movie, television show) appearing in the central field of vision of at least one of the eyes, while the visual characteristics of the presented visual effects still remain non-contextual with respect to the context of content appearing in the central field of vision of the user. Additionally or alternatively, the type and/or visual characteristics of the presented visual effects can be selected based on a type of treatment being or to be performed on the human subject 404.

Figure 5A:
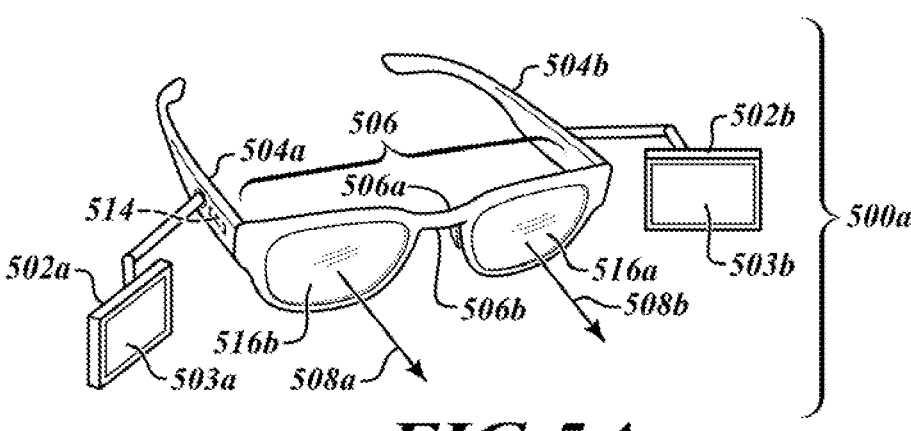
FIG. 5A is an isometric view of a head wearable system to treat aliments and/or enhance brain function via presentation of visual effects in far and/or ultra-far peripheral field including a pair of visual effects generators carried on respective arms of the head wearable system positioned and oriented to present visual effects in at least an ultra-far peripheral field of a user of the head wearable system when worn by the user, according to at least one illustrated implementation.

FIG. 5A is an isometric view of a head wearable system in the form of eyeglasses 500a to treat aliments and/or enhance brain function via presentation of visual effects in far and/or ultra-far peripheral field including a pair of visual effects generators 502a, 502b and sets of optics 503a, 503b carried on respective arms or temples 504a, 504b of the eyeglasses 500a and positioned and oriented to present visual effects in at least an ultra-far peripheral field of a user of the eyeglasses 500a when worn by the user, according to at least one illustrated implementation.

The eyeglasses 500a include a front eyeglass frame 506 from which the arms or temples 504a, 504b extend. In some implementations, each arms or temples 504a, 504b can be coupled to the front eyeglass frame 506 via a respective hinge, allowing the arms or temples 504a, 504b to be pivoted between a closed position in which the arms or temples 504a, 504b are drawn adjacent an inside surface of the front eyeglass frame 506 and an open position in which arms or temples 504a, 504b extend rearwardly from the front eyeglass frame 506 at an approximately right angle. Alternatively, the arms or temples 504a, 504b can be fixed.

The front eyeglass frame 506 has a bridge 506a with a notch 506b to accommodate a portion of a nose of a user when worn, and the arms or temples 504a, 504b extend rearwardly to be supported by respective ears of the user when worn. The arms or temples 504a, 504b can include a saddle at the rearward ends thereof to engage a back of the respective ears of the user when worn. The eyeglass frame 506 and the arms or temples 504a, 504b can be made of any of a large variety of materials, for instance plastics, cellulose acetate, metal. The eyeglass frame 506 includes rims to secure lens 516a, 516b therein. The lenses 516a, 516b comprise optics and can provide magnification and/or vision correction, or can alternatively have zero optical power or corrective ability. The lenses 516a, 516b can be made of any variety of material or materials. Suitable materials can include glass, acrylic, transparent OLEDs and other materials that typically allow transmission of light therethrough.

As illustrated, the visual effects generators 502a, 502b and/or sets of optics 503a, 503b are positioned and oriented with respect to the eyes of a human subject 304 to present visual effects into at least an ultra-far peripheral field of the human subject when the eyeglasses 500a are worn. That is, the visual effects generators 502a, 502b and/or sets of optics 503a, 503b are positioned and oriented to present visual effects into an ultra-far peripheral horizontal static field of each eye which extends rearwardly from a fovea centralis 508a, 508b in a straight ahead static gaze direction to at least 100 degrees or more (e.g., greater than 110 degrees) rearwardly from the fovea centralis 508a, 508b of the respective eye of the human subject.

In at least some implementations the visual effects generators 502a, 502b and/or sets of optics 503a, 503b are positioned laterally outward about 13 cm from the respective sides of the head of the human subject 304 using the respective ear as a reference point, although in some implementations this distance can be much less, even as little as approximately half the distance (e.g., positioned laterally outward about 6.5 cm from the sides of the head). The system can, for example, employ a three hinge assembly on each side thereof to allow selectively positioning and orienting of the visual effects generators 502a, 502b and/or sets of optics 503a, 503b. This can allow the visual effects generators 502a, 502b and/or sets of optics 503a, 503b to be rotated to 13 cm and then brought forward when needed. Alternatively, a goose neck or flexible but resilient metal pipe or coil support, advantageously allowing the visual effects generators 502a, 502b and/or sets of optics 503a, 503b to be selectively positioned and, or oriented in three dimensions (e.g., rotated about each of X, Y and X axis). As the current display is fixed, with the next iteration (3 hinge system) only allowing 2 axis to be manipulated.

When first introduced to the system, the human subject 304 can be oriented, familiarized or prepared for use. For example, the human subject 304 can be instructed to look out of the corner of their eye while a clinician or assistant wiggles a finger far back in the peripheral field of the subject, e.g., around 210°. (Such should be limited to short periods of time of only a few seconds in order to prevent eye strain.) This can be done for both sides or eyes, making sure that there is sufficient light. This technique demonstrates to the human subject 304 that if they shift their central vision, they can see far back even beyond 180°. The human subject 304 is then instructed to shift the central vision forward again. The human subject 304 is then told that if you can see that far back using their central vision then their peripheral vision is seeing at least that far back, even if they are not consciously aware of it. Some subjects report that they are able to feel the sensation of movement and detecting some of the movement as it gets towards the edge of a display (e.g., around 180°) before moving back to the other edge of the display (e.g., around 210°) if they play close attention to their peripheral vision.

The visual effects generators 502a, 502b can take any one or more of a variety of forms. For example, the visual effects generators 502a, 502b can take the form of displays or display panels, for instance: liquid crystal displays (LCDs), light emitting diode (LED) displays, organic light emitting diode (OLED) displays, quantum dot (QLED) displays, active-matrix organic light emitting diode (AMOLED) displays, plasma displays, field emission displays, electronic paper (e-paper) displays, digital light processing (DLP) displays, cathode ray tubes (CRTs) displays. Also for example, the visual effects generators 502a, 502b can take the form of projectors, for instance: digital light processing (DPL) projectors, liquid crystal display (LCD) projectors, organic light emitting diode (OLED) projectors, light emitting diode (LED) projectors, liquid crystal on silicon (LCoS) projectors, and laser projectors. As yet a further example, the visual effects generators 502a, 502b can take the form of one or more mechanical devices, for instance a ball on a track that moves back and forth, a pendulum or metronome, a tube or drum with markings (e.g., spiral or helical lines like a barber pole) on an outer circumference of the tube or drum that spins or rotates or pivots (e.g., about an vertical axis), for instance a e.g., optokinetic drum, each of the mechanical devices which is positioned and oriented to appear in at least the ultra-far peripheral horizontal static field of at least one of each of two eyes of a user.

The optics 503a, 503b can take any one or more of a large variety of forms, for instance: one or more transparent planar sheets or windows, lenses with a non-zero focal power (e.g., planoconvex lens, biconvex lens, planoconcave lens, biconcave lens, meniscus lens, cylindrical lens, aspheric lens), reflectors, mirrors, dichroic mirrors, prisms, gratings, filters, refractors, diffusers, diffractors, polarizers, holographic optical elements and/or collimators. One or more optics 503a, 503b can define an optical path that directs visual effects from the visual effects generators 502a, 502b to the far and/or ultra-far peripheral field of the user.

As illustrated in FIG. 3, the human subject 304 may have a view of the real world which is represented as one or more objects 312. The real world and/or object(s) 312 can have a respective subject matter and/or context (e.g., the circumstances that form the setting for an event, statement, or idea, and in terms of which it can be fully understood and assessed). For example, the real world and/or object(s) 312 can be a book, newspaper, magazine, chalkboard, white board, lecture, seminar, training event, sports event, a theatrical production, children at play or adults at work or leisure. The real world and/or object(s) 312 may require concentration by the human subject in order to comprehend the subject matter. Alternatively or additionally, the eyeglasses 500a can include one or more image generators and optics that provide for a virtual reality, augmented reality, mixed reality and/or extended reality (XR) presentation. (Such is described in more detail with reference to FIG. 6 below.)

The eyeglasses 500a can include a control subsystem 514 (shown in broken line) communicatively coupled to control the visual effects generators 502a, 502b. The control subsystem 514 can be housed in one or both of the arms or temples 504a, 504b of the eyeglasses 500a. The control subsystem 514 can, for example, take the form of a processor based control subsystem (e.g., control subsystem 714 illustrated and described with reference to FIG. 7 below), which provides signals that cause the visual effects generators 502a, 502b to present visual effects in at least the ultra-far peripheral horizontal static field of at least one of each of two eyes of a user who is positioned and oriented as a defined location relative to the visual effects generators 502a, 502b. The control subsystem 514 can be communicatively coupled to the visual effects generators 502a, 502b via a cable or wire, wirelessly via a radio (RF, microwave), or optically via an IR transmitter and receiver pair or via optical fiber with a transmitter and receiver pair.

In operation, the control subsystem 514 can provide signals that cause the visual effects generators 502a, 502b to present visual effects. In some implementations, the control subsystem 514 can determine not only when to present visual effects, but can also determine the particular type and/or visual characteristics of visual effects that will be provided. In other implementations, the control subsystem 514 only determines when to present visual effects, and the particular type and/or visual characteristics of visual effects are either pre-set or are determined by the visual effects generators 502a, 502b. In some implementations, for example where the visual effects generators 502a, 502b are mechanical, the control subsystem 514 only determines when to present visual effects, providing a simple ON/OFF signal or even a prompt to a human to turn the visual effects generators 502a, 502b ON/OFF. Notably, where the visual effects generators 502a, 502b are mechanical, the control subsystem 514 can be omitted.

The plurality of visual effects are preferably non-contextual with respect to content appearing in a central field of vision of at least one of the eyes, for example non-contextual with respect to the real world or object(s). That is the visual effects either have no context (e.g., pattern of lines, dots, other geometric shapes, and/or movement that provides or encodes no information) or a context that is unrelated with the context of any content in a central visual field of the user (e.g., real world or object(s)). The plurality of visual effects preferably do not constitute a cursor, a user input field or other user input or control user interface element. The visual effects can change over time, for example changing randomly or changing between a set of defined visual effects over a sufficiently long time period that the human subject does not detected or perceive a repeating pattern.

The visual effects can be independent of any content appearing in a central field of vision of at least one of the eyes. For example, the type and/or visual characteristics of the presented visual effects can be completely unrelated to any content appearing in the central field of vision of at least one of the eyes. Alternatively, the type and/or visual characteristics of the presented visual effects can be selected based on a type of activity or task being or to be performed by the human subject (e.g., reading, attending a lecture, performance, jewelry making, drawing, near-work or focused detailed work) or type of object (e.g., book, performance, movie, television show) appearing in the central field of vision of at least one of the eyes, while the visual characteristics of the presented visual effects still remain non-contextual with respect to the context of content appearing in the central field of vision of the user. Additionally or alternatively, the type and/or visual characteristics of the presented visual effects can be selected based on a type of treatment being or to be performed on the human subject.

Figure 5B:
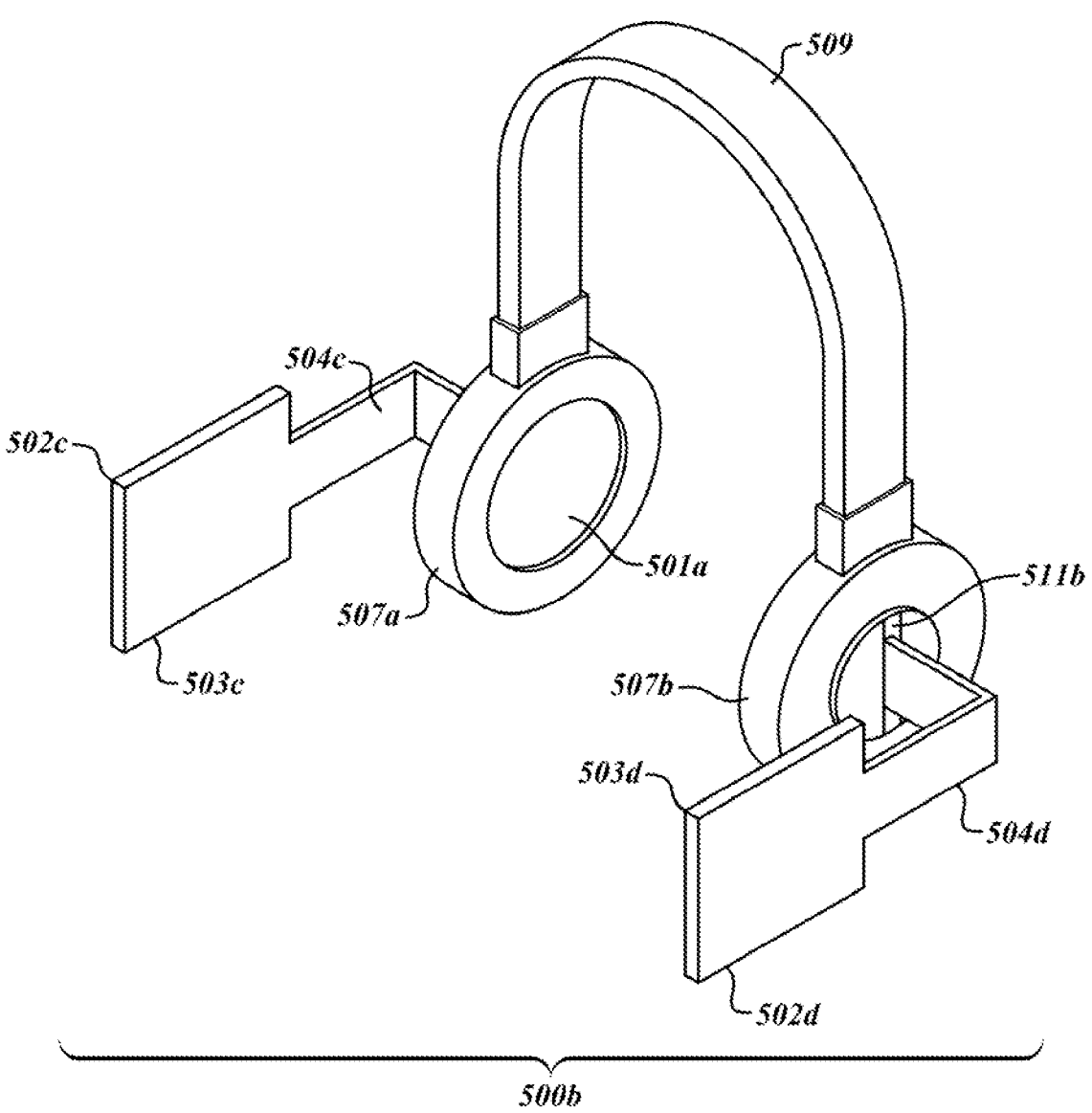
FIG. 5B is an isometric view of a head wearable system to treat aliments and/or enhance brain function via presentation of visual effects in far and/or ultra-far peripheral field including a pair of visual effects generators carried on respective arms of the head wearable system positioned and oriented to present visual effects in at least an ultra-far peripheral field of a user of the head wearable system when worn by the user, according to at least one illustrated implementation.

FIG. 5B is an isometric view of a head wearable system in the form of headphones 500b to treat aliments and/or enhance brain function via presentation of visual effects in far and/or ultra-far peripheral field including a pair of visual effects generators 502c, 502d and sets of optics 503c, 503d carried on respective arms 504c, 504d of the set of headphones 500b and positioned and oriented to present visual effects in at least an ultra-far peripheral field of a user of the set of headphones 500b when worn by the user, according to at least one illustrated implementation.

The set of headphones 500b can, for example, include a pair of speakers 501a (only one visible) in respective housings (e.g., over-the-ear housings as illustrated; or on-ear housings, not illustrated) 507a, 507b, and a headband 509 that couples the respective housings 507a, 507b together. The arms 504c, 504d can extend from respective ones of the housings 507a, 507b. A positon and orientation of the arms 504c, 504d can be fixed with respect to the respective ones of the housings 507a, 507b, or adjustable with respect to respective ones of the housings 507a, 507b. For example, the arms 504c, 504d can movably mounted (e.g., pivotable or rotatable) to respective ones of the housings 507a, 507b. Also for example, the arms 504c, 504d can be bendable, for instance each including a respective stiff wire that can be bent under force but which is stiff enough to retain the visual effects generators 502c, 502d and sets of optics 503c, 503d under the force of gravity or specified amounts of accelera-tion experienced during normal or expected movements of the head. Also for example, the arms 504c, 504d can be extendable, for example each comprised of two or more telescoping members. Additionally or alternatively, the arms 504c, 504d can be detachably attachable to respective ones of the housings 507a, 507b via a selectively detachable mounting fixture or coupler (e.g., screw mount, bayonet mount, snap link) 51 lb (only on visible).

As illustrated, the visual effects generators 502c, 502d and/or sets of optics 503c, 503d are positioned and oriented with respect to the eyes of a human subject 304 to present visual effects into at least an ultra-far peripheral field of the human subject when the set of headphones 500b are worn. That is, the visual effects generators 502c, 502d and/or sets of optics 503c, 503d are positioned and oriented to present visual effects into an ultra-far peripheral horizontal static field of each eye which extends rearwardly from a fovea centralis in a straight ahead static gaze direction to at least 100 degrees or more (e.g., greater than 110 degrees) rear-wardly from the fovea centralis of the respective eye of the human subject.

The visual effects generators 502c, 502d can take any one or more of a variety of forms. For example, the visual effects generators 502c, 502d can take the form of displays or display panels, for instance: liquid crystal displays (LCDs), light emitting diode (LED) displays, organic light emitting diode (OLED) displays, quantum dot (QLED) displays, active-matrix organic light emitting diode (AMOLED) dis-plays, plasma displays, field emission displays, electronic paper (e-paper) displays, digital light processing (DLP) displays, cathode ray tubes (CRTs) displays. Also for example, the visual effects generators 502c, 502d can take the form of projectors, for instance: digital light processing (DPL) projectors, liquid crystal display (LCD) projectors, organic light emitting diode (OLED) projectors, light emit-ting diode (LED) projectors, liquid crystal on silicon (LCoS) projectors, and laser projectors. As yet a further example, the visual effects generators 502c, 502d can take the form of one or more mechanical devices, for instance a ball on a track that moves back and forth, a pendulum or metronome, a tube or drum with markings (e.g., spiral or helical lines like a barber pole) on an outer circumference of the tube or drum that spins or rotates or pivots (e.g., about an vertical axis), for instance a e.g., optokinetic drum, each of the mechanical devices which is positioned and oriented to appear in at least the ultra-far peripheral horizontal static field of at least one of each of two eyes of a user.

The optics 503c, 503d can take any one or more of a large variety of forms, for instance: one or more transparent planar sheets or windows, lenses with a non-zero focal power (e.g., planoconvex lens, biconvex lens, planoconcave lens, bicon-cave lens, meniscus lens, cylindrical lens, aspheric lens), reflectors, mirrors, dichroic mirrors, prisms, gratings, filters, refractors, diffusers, diffractors, polarizers, holographic opti-cal elements and/or collimators. One or more optics 503c, 503d can define an optical path that directs visual effects from the visual effects generators 502c, 502d to the far and/or ultra-far peripheral field of the user.

As illustrated in FIG. 3, the human subject 304 may have a view of the real world which is represented as one or more objects 312. The real world and/or object(s) 312 can have a respective subject matter and/or context (e.g., the circum-stances that form the setting for an event, statement, or idea, and in terms of which it can be fully understood and assessed). For example, the real world and/or object(s) 312 can be a book, newspaper, magazine, chalkboard, white board, lecture, seminar, training event, sports event, a the-atrical production, children at play or adults at work or leisure. The real world and/or object(s) 312 may require concentration by the human subject in order to comprehend the subject matter.

The set of headphones 500b can include a control sub-system, for example similar to the control subsystem 514 of FIG. 5A, communicatively coupled to control the visual effects generators 502c, 502d. The control subsystem can be housed in one or both of the headphones of the set of headphones 500b. The control subsystem can, for example, take the form of a processor based control subsystem (e.g., control subsystem 714 illustrated and described with refer-ence to FIG. 7 below), which provides signals that cause the visual effects generators 502c, 502d to present visual effects in at least the ultra-far peripheral horizontal static field of at least one of each of two eyes of a user who is positioned and oriented as a defined location relative to the visual effects generators 502c, 502d. The control subsystem can be com-municatively coupled to the visual effects generators 502a, 502b via a cable or wire, wirelessly via a radio (RF, microwave), or optically via an IR transmitter and receiver pair or via optical fiber with a transmitter and receiver pair.

In operation, the control subsystem can provide signals that cause the visual effects generators 502c, 502d to present visual effects. In some implementations, the control subsys-tem can determine not only when to present visual effects, but can also determine the particular type and/or visual characteristics of visual effects that will be provided. In other implementations, the control subsystem only deter-mines when to present visual effects, and the particular type and/or visual characteristics of visual effects are either pre-set or are determined by the visual effects generators 502c, 502d. In some implementations, for example where the visual effects generators 502c, 502d are mechanical, the control subsystem only determines when to present visual effects, providing a simple ON/OFF signal or even a prompt to a human to turn the visual effects generators 502c, 502d ON/OFF. Notably, where the visual effects generators 502c, 502d are mechanical, the control subsystem can be omitted.

The plurality of visual effects are preferably non-contex-tual with respect to content appearing in a central field of vision of at least one of the eyes, for example non-contextual with respect to the real world or object(s). That is the visual effects either have no context (e.g., pattern of lines, dots, other geometric shapes, and/or movement that provides or encodes no information) or a context that is unrelated with the context of any content in a central visual field of the user (e.g., real world or object(s)). The plurality of visual effects preferably do not constitute a cursor, a user input field or other user input or control user interface element. The visual effects can change over time, for example changing ran-domly or changing between a set of defined visual effects over a sufficiently long time period that the human subject does not detected or perceive a repeating pattern.

The visual effects can be independent of any content appearing in a central field of vision of at least one of the eyes. For example, the type and/or visual characteristics of the presented visual effects can be completely unrelated to any content appearing in the central field of vision of at least one of the eyes. Alternatively, the type and/or visual characteristics of the presented visual effects can be selected based on a type of activity or task being or to be performed by the human subject (e.g., reading, attending a lecture, performance, jewelry making, drawing, near-work or focused detailed work) or type of object (e.g., book, performance, movie, television show) appearing in the central field of vision of at least one of the eyes, while the visual characteristics of the presented visual effects still remain non-contextual with respect to the context of content appearing in the central field of vision of the user. Additionally or alternatively, the type and/or visual characteristics of the presented visual effects can be selected based on a type of treatment being or to be performed on the human subject.

Figure 5C:
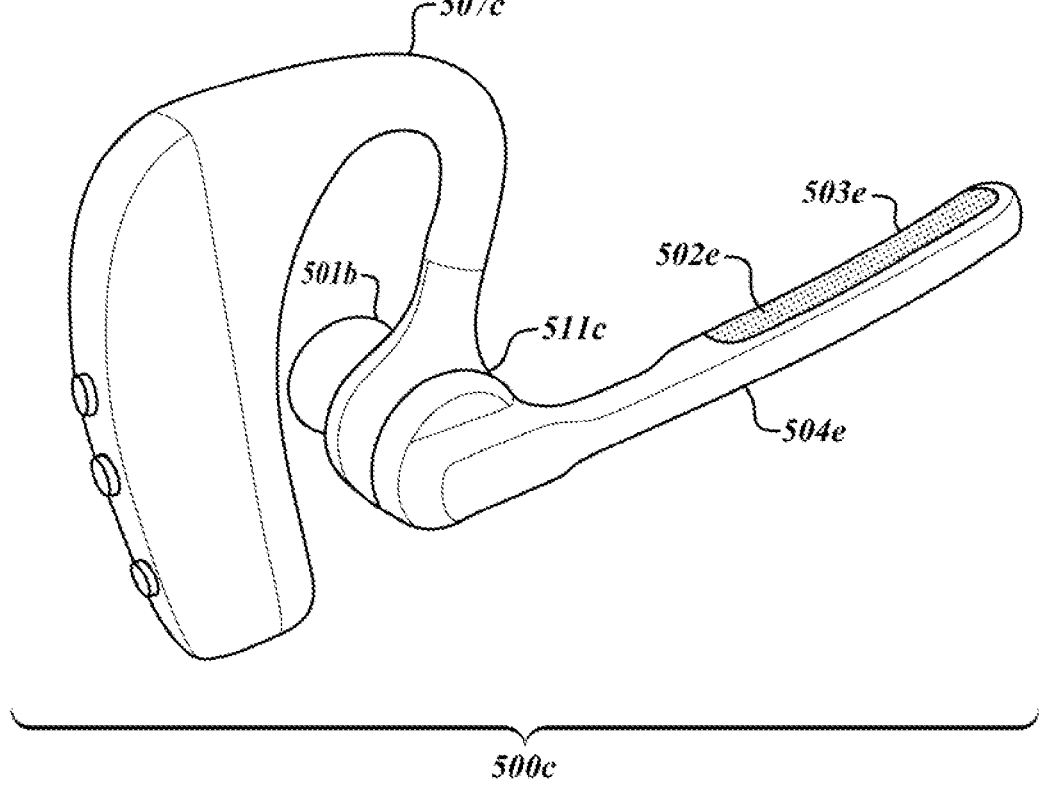
FIG. 5C is an isometric view of a head wearable system to treat aliments and/or enhance brain function via presentation of visual effects in far and/or ultra-far peripheral field including a visual effects generator carried on an arm of the head wearable system positioned and oriented to present visual effects in at least an ultra-far peripheral field of a user of the head wearable system when worn by the user, according to at least one illustrated implementation.

FIG. 5C is an isometric view of a head wearable system in the form of an earpiece 500c to treat aliments and/or enhance brain function via presentation of visual effects in far and/or ultra-far peripheral field including a visual effects generator 502e and set of optics 503e carried on an arm 504e of the earpiece 500c and positioned and oriented to present visual effects in at least an ultra-far peripheral field of a user of the earpiece 500c when worn by the user, according to at least one illustrated implementation.

The earpiece 500c can, for example, include a speaker 501b (in ear or partially in ear speaker) in coupled to a housing (e.g., over-the-ear housings as illustrated; or on-ear housings, not illustrated) 507c worn over the ear. The arm 504e can extend from the housing 507c. A positon and orientation of the arm 504e can be fixed with respect to the housing 507c, or adjustable with respect to the housing 507c. For example, the arm 504e can movably mounted (e.g., pivotable or rotatable) to the housing 507c via a joint 511c. Also for example, the arm 504e can be bendable, for instance each including a stiff wire that can be bent under force but which is stiff enough to retain the visual effects generator 502e and set of optics 503e under the force of gravity or specified amounts of acceleration experienced during normal or expected movements of the head. Also for example, the arm 504e can be extendable, for example comprised of two or more telescoping members. Additionally or alternatively, the arm 504e can be detachably attachable to the housing 507c via a selectively detachable mounting fixture or coupler (e.g., screw mount, bayonet mount, snap link) or joint 511c.

As illustrated, the visual effects generator 502e and/or set of optics 503e are positioned and oriented with respect to the eyes of a human subject 304 to present visual effects into at least an ultra-far peripheral field of the human subject when the earpiece 500c are worn. That is, the visual effects generator 502e and/or optics 503e are positioned and oriented to present visual effects into an ultra-far peripheral horizontal static field of each eye which extends rearwardly from a fovea centralis in a straight ahead static gaze direction to at least 100 degrees or more (e.g., greater than 110 degrees) rearwardly from the fovea centralis of the respective eye of the human subject.

The visual effects generator 502e can take any one or more of a variety of forms. For example, the visual effects generator 502e can take the form of displays or display panels, for instance: liquid crystal displays (LCDs), light emitting diode (LED) displays, organic light emitting diode (OLED) displays, quantum dot (QLED) displays, active-matrix organic light emitting diode (AMOLED) displays, plasma displays, field emission displays, electronic paper (e-paper) displays, digital light processing (DLP) displays, cathode ray tubes (CRTs) displays. Also for example, the visual effects generator 502e can take the form of projectors, for instance: digital light processing (DPL) projectors, liquid crystal display (LCD) projectors, organic light emitting diode (OLED) projectors, light emitting diode (LED) projectors, liquid crystal on silicon (LCoS) projectors, and laser projectors. As yet a further example, the visual effects generator 502e can take the form of one or more mechanical devices, for instance a ball on a track that moves back and forth, a pendulum or metronome, a tube or drum with markings (e.g., spiral or helical lines like a barber pole) on an outer circumference of the tube or drum that spins or rotates or pivots (e.g., about an vertical axis), for instance a e.g., optokinetic drum, each of the mechanical devices which is positioned and oriented to appear in at least the ultra-far peripheral horizontal static field of at least one of each of two eyes of a user.

The optics 503e can take any one or more of a large variety of forms, for instance: one or more transparent planar sheets or windows, lenses with a non-zero focal power (e.g., planoconvex lens, biconvex lens, planoconcave lens, biconcave lens, meniscus lens, cylindrical lens, aspheric lens), reflectors, mirrors, dichroic mirrors, prisms, gratings, filters, refractors, diffusers, diffractors, polarizers, holographic optical elements and/or collimators. One or more optics 503e can define an optical path that directs visual effects from the visual effects generator 502e to the far and/or ultra-far peripheral field of the user.

As illustrated in FIG. 3, the human subject 304 may have a view of the real world which is represented as one or more objects 312. The real world and/or object(s) 312 can have a respective subject matter and/or context (e.g., the circumstances that form the setting for an event, statement, or idea, and in terms of which it can be fully understood and assessed). For example, the real world and/or object(s) 312 can be a book, newspaper, magazine, chalkboard, white board, lecture, seminar, training event, sports event, a theatrical production, children at play or adults at work or leisure. The real world and/or object(s) 312 may require concentration by the human subject in order to comprehend the subject matter.

The earpiece 500c can include a control subsystem, for example similar to the control subsystem 514 of FIG. 5A, communicatively coupled to control the visual effects generator 502e. The control subsystem can be housed in the housing 507c of the earpiece 500c. The control subsystem can, for example, take the form of a processor based control subsystem (e.g., control subsystem 714 illustrated and described with reference to FIG. 7 below), which provides signals that cause the visual effects generator 502e to present visual effects in at least the ultra-far peripheral horizontal static field of at least one of each of two eyes of a user who is positioned and oriented as a defined location relative to the visual effects generator 502e. The control subsystem can be communicatively coupled to the visual effects generator 502e via a cable or wire, wirelessly via a radio (RF, microwave), or optically via an IR transmitter and receiver pair or via optical fiber with a transmitter and receiver pair.

In operation, the control subsystem can provide signals that cause the visual effects generator 502e to present visual effects. In some implementations, the control subsystem can determine not only when to present visual effects, but can also determine the particular type and/or visual characteristics of visual effects that will be provided. In other implementations, the control subsystem only determines when to present visual effects, and the particular type and/or visual characteristics of visual effects are either pre-set or are determined by the visual effects generator 502e. In some implementations, for example where the visual effects generator 502e are mechanical, the control subsystem only determines when to present visual effects, providing a simple ON/OFF signal or even a prompt to a human to turn the visual effects generator 502e ON/OFF. Notably, where the visual effects generator 502e are mechanical, the control subsystem can be omitted.

The plurality of visual effects are preferably non-contextual with respect to content appearing in a central field of vision of at least one of the eyes, for example non-contextual with respect to the real world or object(s). That is the visual effects either have no context (e.g., pattern of lines, dots, other geometric shapes, and/or movement that provides or encodes no information) or a context that is unrelated with the context of any content in a central visual field of the user (e.g., real world or object(s)). The plurality of visual effects preferably do not constitute a cursor, a user input field or other user input or control user interface element. The visual effects can change over time, for example changing randomly or changing between a set of defined visual effects over a sufficiently long time period that the human subject does not detected or perceive a repeating pattern.

The visual effects can be independent of any content appearing in a central field of vision of at least one of the eyes. For example, the type and/or visual characteristics of the presented visual effects can be completely unrelated to any content appearing in the central field of vision of at least one of the eyes. Alternatively, the type and/or visual characteristics of the presented visual effects can be selected based on a type of activity or task being or to be performed by the human subject (e.g., reading, attending a lecture, performance, jewelry making, drawing, near-work or focused detailed work) or type of object (e.g., book, performance, movie, television show) appearing in the central field of vision of at least one of the eyes, while the visual characteristics of the presented visual effects still remain non-contextual with respect to the context of content appearing in the central field of vision of the user. Additionally or alternatively, the type and/or visual characteristics of the presented visual effects can be selected based on a type of treatment being or to be performed on the human subject.

Figure 6:
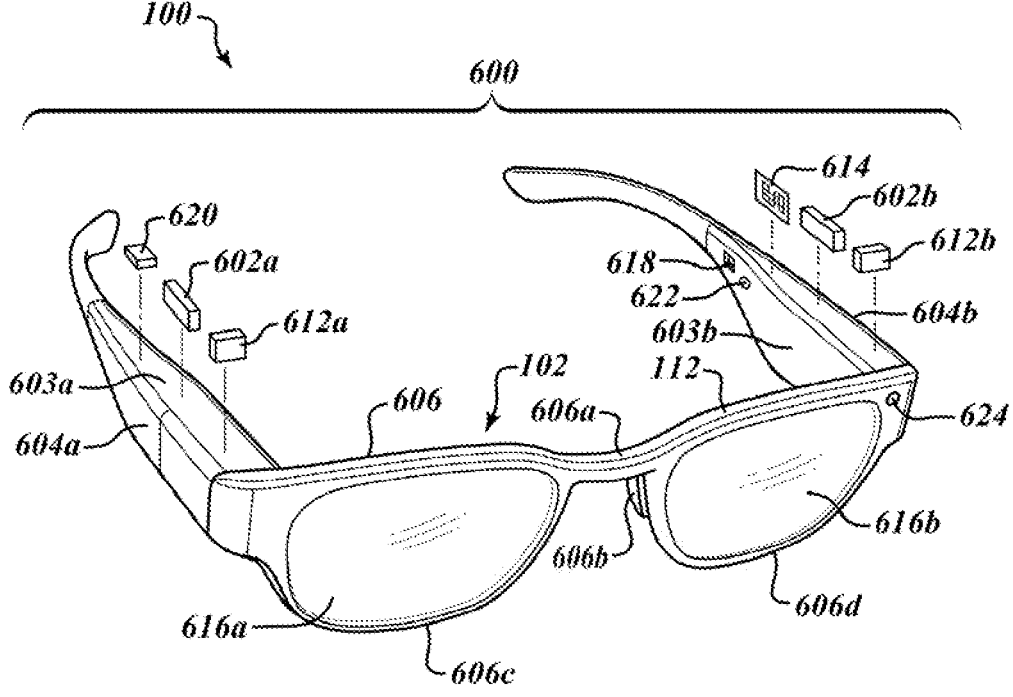
FIG. 6 is an isometric view of a head wearable system to treat aliments and/or enhance brain function via presentation of visual effects in far and/or ultra-far peripheral field including a pair of visual effects generators that project visual effects in at least an ultra-far peripheral field of a user of the head wearable system when worn by the user via transparent portions of respective arms of the head wearable system, according to at least one illustrated implementation.

FIG. 6 is an isometric view of a head wearable system in the form of virtual reality (VR), augmented reality (AR), mixed reality (MR) and/or extended reality (XR) head set 600 to treat aliments and/or enhance brain function via presentation of visual effects in far and/or ultra-far peripheral field including a pair of visual effects generators 602a, 602b carried in cavities of respective arms or temples 604a, 604b of the VR/AR/MR/XR head set 600 (shown as removed from the cavities for sake if illustration) and positioned and oriented to present visual effects in at least an ultra-far peripheral field of a user of the VR/AR/MR/XR head set 600 when worn by the user. The VR/AR/MR/XR head set 600 also includes a pair of image generators 612a, 612b carried in cavities of respective arms or temples 604a, 604b of the VR/AR/MR/XR head set 600 (shown as removed from the cavities for sake if illustration), positioned and oriented to present visual effects in at least a central field of vision of a user of the VR/AR/MR/XR head set 600 when worn by the user, according to at least one illustrated implementation.

The VR/AR/MR/XR head set 600 includes a front frame 606 from which the arms or temples 604a, 604b extend. In some implementations, each arms or temples 604a, 604b can be coupled to the front frame 606 via a respective hinge, allowing the arms or temples 604a, 604b to be pivoted between a closed position in which the arms or temples 604a, 604b are drawn adjacent an inside surface of the front eyeglass frame 606 and an open position in which arms or temples 604a, 604b extend rearwardly from the front frame 606 at an approximately right angle. Alternatively, the arms or temples 604a, 604b can be fixed.

The front frame 606 includes rims 606c, 606d to secure lens 616a, 616b therein. The lens 616a, 616b comprise or constitute optics that can cause images generated by the image generators 612a, 612b to be directed into a central field of vision of the user when the is worn by the user. In some implementations, the lenses 616a, 616b can prevent the passage of light or otherwise block a view of the real world while causing images generated by the image generators 612a, 612b to be directed into a central field of vision of the user, to provide a virtual reality (VR) or mixed reality (MR) experience to the user. In some implementations, the lenses 616a, 616b can allow the passage of light or otherwise not block a view of the real world (e.g., dichroic mirrors) while cause images generated by the image generators 612a, 612b to be directed into a central field of vision of the user, to provide an augmented reality (AR) or mixed reality (MR) experience to the user. The lenses 616a, 616b can optionally comprise optics and can provide magnification and/or vision correction, or can alternatively have zero optical power or corrective ability. The lens 616a, 616b can be made of any variety of material or materials. Suitable materials can include glass, acrylic and other materials that typically allow transmission of light therethrough. The optic(s) can present the images with focusing or without focusing. Additionally or alternatively, the optic(s) can present the images with polarization or without polarization.

In an implementation, the arms or temples 604a, 604b carry certain display-producing components, for example one or more of a projector (e.g., a scanning laser projector with laser diodes), or a micro-display (e.g., liquid crystal display (LCD) or organic light emitting diode (OLED) display). Display components embedded in and part of the lenses 616a, 616b may be a waveguide which receives light from the display-producing components and guides the light towards an eye of the user, or may be a reflector, refractor, or diffractor; for example, a holographic optical element, to, for example, provide a virtual reality or an augmented reality experience.

The front frame 606 has a bridge 606a with a notch to accommodate a portion of a nose of a user when worn, and the arms or temples 604a, 604b extend rearwardly to be supported by respective ears of the user when worn. The arms or temples 604a, 604b can include a saddle at the rearward ends thereof to engage a back of the respective ears of the user when worn. The front frame 606 and the arms or temples 604a, 604b can be made of any of a large variety of materials, for instance plastics, cellulose acetate, metal.

The VR/AR/MR/XR head set 600 may include adjustable nose pads, such as nose pad 606b, to assist with customization of the fit of VR/AR/MR/XR head set 600 to the user. The VR/AR/MR/XR head set 600 preferably includes two nose pads 606b (only one visible in FIG. 6), wherein each nose pad 606b is coupled to front frame 606 or a respective rim 606c, 606d of the front frame 606, and the nose pads 606b are adjustable in orientation as well as vertically and horizontally. Accordingly, the nose pads 606b enable lenses 616a, 616b to be adjusted relative to the user's eye (i.e., adjusting the nose pads 606b adjusts a height of the lenses 616a, 616b relative to the eyes of a user). Adjusting the angular orientation of the nose pads 606b enables a secure fit on the nose of the user, further preventing the VR/AR/MR/XR head set 600 from falling off of a user's face. In an implementation, nose pads 606b are also adjustable horizontally so as to further assist in adjusting the VR/AR/MR/XR head set 600 with respect to the eyes of a user, and further enabling a secure fit on the nose of the user (i.e., adjusting width ensures the nose pads 606b establish a secure, comfortable fit with a nose of a user, and adjusting positioning of nose pads 606b with respect to front frame 606 enables positioning with respect to eyes of the user).

As illustrated, the visual effects generators 602a, 602b and/or sets of optics 603a, 603b are positioned and oriented with respect to the eyes of a human subject 304 to present visual effects into at least an ultra-far peripheral field of the human subject when the VR/AR/MR/XR head set 600 are worn. That is, the visual effects generators 602a, 602b and/or sets of optics 603a, 603b are positioned and oriented to present visual effects into an ultra-far peripheral horizontal static field of each eye which extends rearwardly from a fovea centralis 608a, 608b in a straight ahead static gaze direction to at least 100 degrees or more (e.g., greater than 110 degrees) rearwardly from the fovea centralis 608a, 608b of the respective eye of the human subject. In at least one implementation, the sets of optics 603a, 603b can take the form of or otherwise include one or portions of each arms or temples 604a, 604b which are transparent to light or transparent to select wavelengths of light (e.g., IR), those portions constituting optics 603a, 603b, for example with zero magnification power.

The visual effects generators 602a, 602b can take any one or more of a variety of forms. For example, the visual effects generators 602a, 602b can take the form of displays or display panels, for instance: liquid crystal displays (LCDs), light emitting diode (LED) displays, organic light emitting diode (OLED) displays, quantum dot (QLED) displays, active-matrix organic light emitting diode (AMOLED) displays, plasma displays, field emission displays, electronic paper (e-paper) displays, digital light processing (DLP) displays, cathode ray tubes (CRTs) displays. Also for example, the visual effects generators 602a, 602b can take the form of projectors, for instance: digital light processing (DPL) projectors, liquid crystal display (LCD) projectors, organic light emitting diode (OLED) projectors, light emitting diode (LED) projectors, liquid crystal on silicon (LCoS) projectors, and laser projectors.

The optics 603a, 603b can take any one or more of a large variety of forms, for instance: one or more transparent planar sheets or windows, and/or one or more lenses with a non-zero focal power (e.g., planoconvex lens, biconvex lens, planoconcave lens, biconcave lens, meniscus lens, cylindrical lens, aspheric lens), reflectors, mirrors, dichroic mirrors, prisms, gratings, filters, refractors, diffusers, diffractors, polarizers, holographic optical elements and/or collimators. One or more optics 603a, 603b can define an optical path that directs visual effects from the visual effects generators 602a, 602b to the far and/or ultra-far peripheral field of the user.

As illustrated in FIG. 3, in an A/R implementation the human subject 304 may have a view of the real world which is represented as one or more objects 312. The real world and/or object(s) 312 can have a respective subject matter and/or context (e.g., the circumstances that form the setting for an event, statement, or idea, and in terms of which it can be fully understood and assessed). For example, the real world and/or object(s) 312 can be a book, newspaper, magazine, chalkboard, white board, lecture, seminar, training event, sports event, a theatrical production, children at play or adults at work or leisure. The real world and/or object(s) 312 may require concentration by the human subject in order to comprehend the subject matter. Whether operating in a V/R or an A/R implementation the VR/AR/MR/XR head set 600 can include one or more image generators 612a, 612b and optics (e.g., lenses 616a, 616b) that provide for a virtual reality and/or augmented or even mixed reality presentation.

The lenses 616a, 616b can take any one or more of a large variety of forms, for instance: one or more transparent planar sheets or windows, and/or one or more lenses with a non-zero focal power (e.g., planoconvex lens, biconvex lens, planoconcave lens, biconcave lens, meniscus lens, cylindrical lens, aspheric lens), reflectors, mirrors, dichroic mirrors, prisms, gratings, filters, refractors, diffusers, diffractors, polarizers, holographic optical elements and/or collimators. One or more lenses 616a, 616b can define an optical path that directs images from the image generators 612a, 612b to the central field of vision.

In some implementations, a single display, projector or other device can be used to generate both the visual effects and the images. In such implementations, there can be a respective single display, projector or other device to generate both the visual effects and the images for each eye, or there can be a single display, projector or other device to generate both the visual effects and the images for both eyes.

The VR/AR/MR/XR head set 600 can include a control subsystem 614 communicatively coupled to control the visual effects generators 602a, 602b and image generators 612a, 612b. The control subsystem 614 can, for example, be housed in one or both of the arms or temples 604a, 604b of the VR/AR/MR/XR head set 600. The control subsystem 614 is shown as a PCB removed from a cavity of arm or temple 604b, for sake if illustration.

The control subsystem 614 can, for example, take the form of a processor based control subsystem (e.g., control subsystem 714 illustrated and described with reference to FIG. 7 below), which provides signals that cause the visual effects generators 602a, 602b to present visual effects in at least the ultra-far peripheral horizontal static field of at least one of each of two eyes of a user who is positioned and oriented as a defined location relative to the visual effects generators 602a, 602b. The control subsystem 614 can be communicatively coupled to the visual effects generators 602a, 602b via a cable or wire, wirelessly via a radio (RF, microwave, BLUETOOTH®), or optically via an IR transmitter and receiver pair or via optical fiber with a transmitter and receiver pair.

In operation, the control subsystem 614 can provide signals that cause the visual effects generators 602a, 602b to present visual effects. In some implementations, the control subsystem 614 can determine not only when to present visual effects, but can also determine the particular type and/or visual characteristics of visual effects that will be provided. In other implementations, the control subsystem 614 only determines when to present visual effects, and the particular type and/or visual characteristics of visual effects are either pre-set or are determined by the visual effects generators 602a, 602b. In some implementations, the control subsystem 614 only determines when to present visual effects, providing a simple ON/OFF signal to turn the visual effects generators 602a, 602b ON/OFF.

The plurality of visual effects are preferably non-contextual with respect to content appearing in a central field of vision of at least one of the eyes, for example non-contextual with respect to the real world or object(s) or with respect to augmented reality content or objects presented to the central field of vision by the image generator(s) 612*a*, 612*b*. That is the visual effects either have no context (e.g., pattern of lines, dots, other geometric shapes, and/or movement that provides or encodes no information) or a context that is unrelated with the context of any content in a central visual field of the user (e.g., real world or object(s); augmented reality content or objects). The plurality of visual effects preferably do not constitute a cursor, a user input field or other user input or control user interface element. The visual effects can change over time, for example changing randomly or changing between a set of defined visual effects over a sufficiently long time period that the human subject does not detected or perceive a repeating pattern.

The visual effects can be independent of any content appearing in a central field of vision of at least one of the eyes. For example, the type and/or visual characteristics of the presented visual effects can be completely unrelated to any content appearing in the central field of vision of at least one of the eyes. Alternatively, the type and/or visual characteristics of the presented visual effects can be selected based on a type of activity or task being or to be performed by the human subject (e.g., reading, attending a lecture or performance, playing a video game, jewelry making, drawing, near-work or focused detailed work) or type of object (e.g., book, performance, movie, television show) appearing in the central field of vision of at least one or both (each) of the eyes, while the visual characteristics of the presented visual effects still remain non-contextual with respect to the context of content appearing in the central field of vision of the user. Additionally or alternatively, the type and/or visual characteristics of the presented visual effects can be selected based on a type of treatment being or to be performed on the human subject.

As illustrated in FIG. 6, the VR/AR/MR/XR head set 600 may have one or more image generators 612*a*, 612*b*. The image generator(s) 612*a*, 612*b* and/or associated lenses 616*a*, 616*b* are positioned and oriented to present images in the center vision field of the user, for instance when the user wears the VR/AR/MR/XR head set 600. The image generator(s) 612*a*, 612*b* can take any one or more of a variety of forms. For example, the image generator(s) 612*a*, 612*b* can take the form of displays or display panels, for instance: liquid crystal displays (LCDs), light emitting diode (LED) displays, organic light emitting diode (OLED) displays, quantum dot (QLED) displays, active-matrix organic light emitting diode (AMOLED) displays, plasma displays, field emission displays, electronic paper (e-paper) displays, digital light processing (DLP) displays, cathode ray tubes (CRTs) displays. Also for example, the image generator(s) 612*a*, 612*b* can take the form of projectors, for instance: digital light processing (DPL) projectors, liquid crystal display (LCD) projectors, organic light emitting diode (OLED) projectors, light emitting diode (LED) projectors, liquid crystal on silicon (LCoS) projectors, and laser projectors, or a screen onto which the projector(s) project images.

The image generator(s) 612*a*, 612*b* can present images that have a respective subject matter and/or context (e.g., the circumstances that form the setting for an event, statement, or idea, and in terms of which it can be fully understood and assessed). For example, the image generator(s) 612*a*, 612*b* can present a visual or audiovisual presentation, lesson, lecture, seminar, training session, broadcast, newscast, book reading, movie, sports event, or theatrical production. The content presented via the center image generator(s) 612*a*, 612*b* may require concentration by the human subject in order to comprehend the subject matter.

As noted above, the control subsystem 614 can, for example, take the form of a processor based control subsystem, the control subsystem which provides signals that cause the image generators 612*a*, 612*b* to present image in at least the central field of vision of at least one of each of two eyes of a user who wearing the VR/AR/MR/XR head set 600. The control subsystem 614 can be communicatively coupled to the image generators 612*a*, 612*b* via a cable or wire, wirelessly via a radio (RF, microwave, BLUETOOTH®), or optically via an IR transmitter and receiver pair or via optical fiber with a transmitter and receiver pair.

The VR/AR/MR/XR head set 600 can include one or more transducers (e.g., sensors, actuators), for example speakers or bone conduction transducers 618 (only one visible) positioned on or in one or both of the arms or temples 604*a*, 604*b* to provide audio and or vibration or tactile input to the user when the VR/AR/MR/XR head set 600 is worn. Also for example, the VR/AR/MR/XR head set 600 can include one or more posture neck vibrators (e.g., haptic engine, mass suspended to vibrate and motor, solenoid or electromagnet operable to cause the mass to vibrate) 620 (shown as removed from the cavities for sake if illustration) and/or heart rate monitors 622, for example positioned on or in one or both of the arms or temples 604*a*, 604*b*. Also for example, the VR/AR/MR/XR head set 600 can include one or more cameras or image sensors, for example one or more front facing cameras 624. Each of the transducers can be communicatively coupled to the control subsystem 614.

Transducers (e.g., sensors) can, for example, take the form of those responsive to heart rate, galvanic skin response, and/or oximetry sensor. While generally illustrated as part of the VR/AR/MR/XR head set 600, one or more or even all transducers can be provided as separate and distinct structures from the VR/AR/MR/XR head set 600. Such transducers are communicatively coupled, either directly or indirectly, with the VR/AR/MR/XR head set 600, for example via one or more radios or transceivers with associated antenna. One or more or even all transducers can be provided as separate and distinct wearable, for example in the form of a watch or "fitness" band.

Collection of data, particularly real time data, that represents or characterizes one or more physical characteristics of a subject can advantageously be employed to set a balance between a sympathetic and a parasympathetic system of the subject. This balance might be that the sympathetic system is engaged ⅓ of the time with the parasympathetic system engaged ⅔ in a given day or other period or cycle. It is noted that engagement of the parasympathetic system can include not only presentation of visual effects in the respective ultra-far peripheral horizontal static field of the eyes but can also include engagement with other senses (e.g., auditory, tactile).

The VR/AR/MR/XR head set 600 can include one or more communications components, for example radios and antennas, IR diodes, and or wired, optical or wireless communications ports.

While the VR/AR/MR/XR head set 600 is illustrated as a set of eyeglasses, such could alternatively take the form of goggles, a helmet (e.g., pilot helmet, race car driver helmet, skier helmet, bobsledder helmet), an earpiece, or other head worn device.

Figure 7:
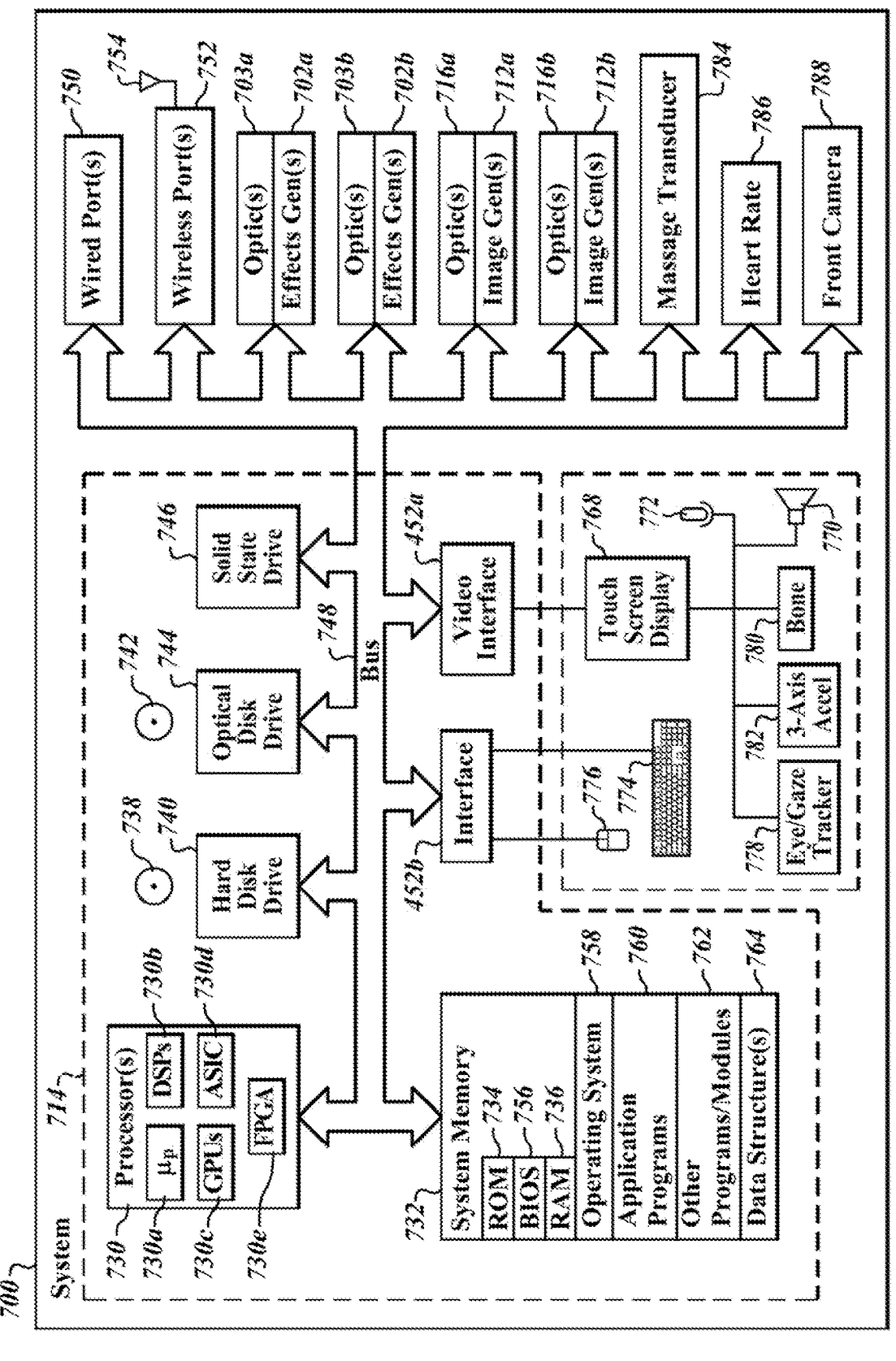
FIG. 7 is a block diagram of a system to treat aliments and/or enhance brain function via presentation of visual effects in far and/or ultra-far peripheral field including a control subsystem and a pair of visual effects generators, according to at least one illustrated implementation.

FIG. 7 is a block diagram of a system 700 to treat aliments and/or enhance brain function via presentation of visual effects in far and/or ultra-far peripheral field and optionally present images or content in a central visual field, the system 700 including a pair of visual effects generators 702a, 702b and associated optics 703a, 703b, optional image generators 712a, 712b and associated optics 716a, 716b, a control subsystem 714, according to at least one illustrated implementation. The example control subsystem 714 can be employed in any one or more of illustrated implementations described herein (e.g., FIGS. 3-5) with or without modifications, and can execute any of the processes or methods described herein.

The visual effects generators 702a, 702b and/or sets of optics 703a, 703b are positioned and oriented with respect to the eyes of a human subject 304 to present visual effects into at least an ultra-far peripheral field of the human subject when the VR/AR/MR/XR head set 600 are worn. That is, the visual effects generators 702a, 702b and/or sets of optics 703a, 703b are positioned and oriented to present visual effects into an ultra-far peripheral horizontal static field of each eye which extends rearwardly from a fovea centralis of the respective eye to at least 100 degrees or more (e.g., greater than 110 degrees) rearwardly from the fovea centralis of the respective eye of the human subject.

The visual effects generators 702a, 702b can take any one or more of a variety of forms. For example, the visual effects generators 702a, 702b can take the form of displays or display panels, for instance: liquid crystal displays (LCDs), light emitting diode (LED) displays, organic light emitting diode (OLED) displays, quantum dot (QLED) displays, active-matrix organic light emitting diode (AMOLED) displays, plasma displays, field emission displays, electronic paper (e-paper) displays, digital light processing (DLP) displays, cathode ray tubes (CRTs) displays. Also for example, the visual effects generators 702a, 702b can take the form of projectors, for instance: digital light processing (DPL) projectors, liquid crystal display (LCD) projectors, organic light emitting diode (OLED) projectors, light emitting diode (LED) projectors, liquid crystal on silicon (LCoS) projectors, and laser projectors.

The associated optics 703a, 703b can take any one or more of a large variety of forms, for instance: one or more transparent planar sheets or windows, and/or one or more lenses with a non-zero focal power (e.g., planoconvex lens, biconvex lens, planoconcave lens, biconcave lens, meniscus lens, cylindrical lens, aspheric lens), reflectors, mirrors, dichroic mirrors, prisms, gratings, filters, refractors, diffusers, diffractors, polarizers, holographic optical elements and/or collimators. One or more optics 703a, 703b can define an optical path that directs visual effects from the visual effects generators 702a, 702b to the far and/or ultra-far peripheral field of the user.

The optional image generator(s) 712a, 712b (also referred to as center image generators) and associated optics 716a, 716b are is positioned and oriented to present images in the center vision field of a user (e.g., human subject), for instance when the human subject is correctly positioned or when eyeglasses or wearable VR/AR/MR/XR head set is correctly worn. The image generator(s) 712a, 712b can take any one or more of a variety of forms. For example, the image generator(s) 712a, 712b can take the form of displays or display panels, for instance: liquid crystal displays (LCDs), light emitting diode (LED) displays, organic light emitting diode (OLED) displays, quantum dot (QLED) displays, active-matrix organic light emitting diode (AMOLED) displays, plasma displays, field emission displays, electronic paper (e-paper) displays, digital light processing (DLP) displays, cathode ray tubes (CRTs) displays. Also for example, the image generator(s) 712a, 712b can take the form of projectors, for instance: digital light processing (DPL) projectors, liquid crystal display (LCD) projectors, organic light emitting diode (OLED) projectors, light emitting diode (LED) projectors, liquid crystal on silicon (LCoS) projectors, and laser projectors, or a screen onto which the projector(s) project images.

The associated optics 716a, 716b can take any one or more of a large variety of forms, for instance: one or more transparent planar sheets or windows, and/or one or more lenses with a non-zero focal power (e.g., planoconvex lens, biconvex lens, planoconcave lens, biconcave lens, meniscus lens, cylindrical lens, aspheric lens), reflectors, mirrors, dichroic mirrors, prisms, gratings, filters, refractors, diffusers, diffractors, polarizers, holographic optical elements and/or collimators. One or more lenses 716a, 716b can define an optical path that directs images from the image generators 712a, 712b to the central field of vision.

The optional image generators 712a, 712b and/or optics 716a, 716b (e.g., lenses, mirrors, prisms and/or holographs) can present images to the central field of vision of a user, for example providing content for instance as part of a virtual reality and/or augmented or even mixed reality presentation. For example, the image generator(s) 712a, 712b and/or optics 716a, 716b can present images that have a respective subject matter and/or context (e.g., the circumstances that form the setting for an event, statement, or idea, and in terms of which it can be fully understood and assessed). For example, the image generator(s) 712a, 712b and/or optics 716a, 716b can present a visual or audiovisual presentation, lesson, lecture, seminar, training session, broadcast, newscast, book reading, movie, sports event, or theatrical production. The content presented via the center image generator(s) 712a, 712b may require concentration by the human subject in order to comprehend the subject matter.

The control subsystem 714 may include one or more processors 730, for example, one or more of: one or more microcontrollers, one or more microprocessors, 730a one or more central processing units, one or more digital signal processors (DSPs) 730b, one or more graphics processing units (GPUs) 730c, one or more application specific integrated circuits (ASICs) 730d, one or more field programmable gate arrays (FPGAs) 730e, and/or one or more programmable logic controllers (PLCs). The control subsystem 714 may include one or more nontransitory storage media, for example, one or more nonvolatile storage media and/or one or more volatile storage media, for example a system memory 732 that includes one or more of: one or more read only memories (ROMs) 734, one or more random access memories (RAMs) 736, one or more magnetic disk 738 and associated drives 740, one or more optical disk drives 742 and associated drives 744, one or more solid state drives 746 (e.g., FLASH memory), one or more cache memories, and/or one or more registers of one or more processors 730. The control subsystem 714 may include one or more communications channels 748 (e.g., buses) that communicatively couple the processor(s) with the storage media. The control subsystem 714 may include one or more communications ports, for example one or more wired communications ports 750, wireless communications ports 752 (e.g., Wi-Fi and/or Bluetooth radios and associated antennas 754; infrared transceivers) that provide for communications between the control subsystem 714 and external devices.

The processor(s) 730 of the control subsystem 714 are operable to execute logic, for example to execute one or more algorithms stored as process-executable instructions by the one or more nontransitory storage media. Suitable algorithms are set out herein. Process-executable instructions may, for example, include a basic input/output operating system (BIOS) 756, for example stored in ROM 734. Process-executable instructions may, for example, include an operating system (OS) 758, for example stored in RAM 736 during execution. Process-executable instructions may, for example, include one or more application programs 760, which provide the logic to collect user information, map transfers between storage and carrier cassettes, verify that the specimen containers are at the correct positions in the carrier or storage cassettes, and establish evidence of a chain-of-custody for the same, the applications program(s) stored, for example, in RAM 736 during operation. Process-executable instructions may include one or more other programs or modules 762, for example to provide for communications with external devices and/or to control operation of co-robot(s) 405, and which may be stored, for example, in RAM 736 during execution. One or more data structures 764 may store information, for example information that identifies specific users, identifies specific clinicians, identifies specific patients, identifies specific procedures, identifies specific specimen containers and associates the specific specimen containers with specific patients, and that maps specimen containers to respective storage cassettes and/or carrier cassettes. The data structures 764 may take a variety of forms including databases, data sets, records and fields, tables, linked lists, trees, binary trees, etc. The data structures 764 may be stored, for example, in RAM 736 during execution.

The processor(s) 730 of the control subsystem 714 are communicatively coupled operable (e.g., wired, optical, wireless or radio) to control operation of one or more of the visual effects generators 702a, 702b and optionally the image generator(s) 712a, 712b. The processor(s) 730 of the control subsystem 714 are also operable to receive user input from, and provide user out to, one or more user interface devices of a user interface system 766, to allow a human user to interact with the system 700.

The user interface system 766 may, for example, include one or more of: one or more display screens, one or more touch-sensitive display screens 768, one or more speakers 770, one or more microphones 772, one or more keyboards 774, one or more pointer devices 450 (e.g., computer mouse, trackpad, trackball), one or more eye or gaze tracker 778, one or more bone conductors 780 to produce audible signals via conductive of vibrations, one or more accelerometers (e.g., 3-axis accelerometer) 782, one or more haptic interfaces (not shown). The processor(s) 730 can optionally employ the output of the accelerometers to provide for inertial stabilization of the visual effects and the images with respect to head movement. The components of the user interface system 766 are communicatively coupled (e.g., wired, optical, wireless or radio) with the processor(s) 730 via one or more peripheral interfaces 452a, 452b to provide user input to the processor(s) 730 and to receive output from the processor(s) 730 to be presented to a user. In particular, the processor(s) 730 may execute processor-executable instructions that cause the processor(s) to cause devices to present a user interface (e.g., a graphical user interface), for instance via a touch screen display 768. Various user interface elements are illustrated and described herein.

The user interface (UI) system 766 can include one or more user interface (UI) components, for example one or more switches, triggers, display screens (e.g., LCD display), lights (e.g., LEDs), speakers, microphones, haptic engines, graphical user interfaces (GUIs) with via a touch-sensitive display screen which displays user-selectable icons operable to allow input to the control subsystem 714 and/or output from the control subsystem 714. The UI components allow a user to control operation and/or optionally to receive information. For example, a user may press a button, key or trigger, or can use eye movements to provide input to the control subsystem 714.

The system 700 can also include one or more message transducers 784 operable to provide vibration to a portion of a user, for example providing a neck message. The message transducers 784 can include a mass and an actuator (e.g., electric motor, solenoid, electromagnetic) that is operable to cause the mass to oscillate or vibrate. The frequency and/or magnitude of the oscillation or vibration can be adjustable. The one or more message transducers 784 can be communicatively coupled to the processor(s) 730 to be controlled thereby.

The system 700 can also include one or more heart rate transducers or monitors 786 operable to detect and/or track a heart rate of a user, for example detecting a pulse proximate a neck and/or temples of the user. The one or more heart rate transducers or monitors 786 can be communicatively coupled to the processor(s) 730 to provide signals thereto indicative of heart rate for analysis thereby.

The system 700 can also include one or more cameras 788, for example a front facing camera, operable to capture images of an environment in which the user is located and/or back facing cameras to capture images of the user, for instance for eye or gaze tracking, capture of blink rate and/or capture of expressions or mouth movement. The one or more cameras 788 can be communicatively coupled to the processor(s) 730 to provide image date thereto for analysis thereby.

The control subsystem 714 can take the form of a distinct device, coupled to one or more projectors or displays, or can be part of a wearable device (e.g., eyeglasses 500a, headphones 500b, VR/AR/MR/XR head set 600), for instance located in or on a wearable heads up display. The control subsystem 714 can operate in a standalone mode, or can be communicatively coupled (e.g., networked) to other processor-based devices. It will be understood that a wearable device (e.g., eyeglasses 500a, headphones 500b, VR/AR/MR/XR head set 600) may include some components of control subsystem 714, but not necessarily all of the components of the control subsystem 714. In a networked deployment, the control subsystem 714 may operate as a server, a client, or both in server-client network environments. In an example, the control subsystem 714 may function as a peer machine in peer-to-peer (P2P) or other distributed network environment. The control subsystem 714 can take the form of a personal computer (PC), a tablet computer, a set-top box (STB), a personal digital assistant (PDA), or any machine capable of executing instructions (sequential or otherwise) that specify actions to be taken by the machine. Further, while only a single control subsystem 714 is illustrated, the term "control subsystem" shall also be taken to include any collection of control subsystems (e.g., a respective control subsystem housed in each arm or temple) that individually or jointly execute a set (or multiple sets) of instructions to perform any one or more of the methodologies discussed herein.

Various implementations described herein may include, or may operate by, logic or a number of components, or mechanisms. Circuitry is a collection of circuits implemented in tangible entities that include hardware (e.g., simple circuits, gates, logic, etc.). Circuitries include circuit elements that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating.

In an example, one or any combination of the hardware processor(s) 730, system memory 732, magnetic disk 738, optical disk 742 and/or solid state drive 746 constitute machine-, computer- or processor readable media. The terms "machine-readable media", "computer readable media" and "processor-readable media" may include a single medium or multiple media (e.g., a centralized or distributed database, and/or associated caches and servers) operable to store one or more computer- or processor-executable instructions. The terms "machine-readable media", "computer readable media" and "processor-readable media" include any medium that is capable of storing, encoding, or carrying instructions for execution by the processor(s) 730 and that cause the processor(s) 730 to perform any one or more of the techniques of the present disclosure, or that is capable of storing, encoding or carrying data structures used by or associated with such instructions. Non-limiting examples of terms "machine-readable media", "computer readable media" and "processor-readable media" include solid-state memories, and optical and magnetic media. The terms "machine-readable media", "computer readable media" and "processor-readable media" do not include non-transitory propagating signals. Examples of nontransitory machine-readable media, nontransitory computer readable media and nontransitory processor-readable media include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; and CD-ROM and DVD-ROM disks.

Communications can utilize any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, interface devices may include one or more physical jacks (e.g., Ethernet, coaxial, or phone jacks) or one or more antennas to connect to the communications network 826. In an example, interface devices may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the control subsystem 700, and includes digital or analog communications signals or other intangible medium to facilitate communication of such software.

In operation, the processor(s) 730 can employ information from various physiological sensors that reflect perceptual and psychomotor responses of the user. The sensors can take the form of one or more physiological sensors that reflect perceptual and psychomotor responses of the user. The sensors can take any of a wide variety of forms, for example: heart rate sensors, pulse oxygen saturation sensors, blood pressure sensors, temperature sensors or thermocouples, respiration rate sensors, galvanic skin response sensors, impedance sensors, electrochemical sensors, electromyogram sensors, electroencephalogram (EEG) sensors, electrocardiogram (ECG) sensors, accelerometers, eye fatigue sensors, cameras or other image sensors.

The processor(s) 730 can change, modify or adjust the visual effects or aspects thereof based on the sensed perceptual and psychomotor responses of the user. For example, the processor(s) 730 can change, modify or adjust the visual effects or aspects thereof to train a physiological response of the user to the visual stimuli. The adaptation by the user can sensed or measured, and the processor(s) 730 can change, modify or adjust the visual effects or aspects thereof presented to the user in real time.

As previously explained, the visual effects are non-contextual, having no context, providing no information, or having a context unrelated, inapplicable or insignificant with any content in a central visual field of the user or any context of any content in a central visual field of the user, whether that content in the central visual field of the user is actively presented by the system or not (e.g., real world view). As previously explained, the visual effects can be presented in the ultra-far peripheral field so can be visually inconspicuous or visually imperceptible via the normal central vision system of the brain. As previously explained, the visual effects can optionally be presented in a portion of the electromagnetic spectrum (e.g., infrared) so can be visually inconspicuous or visually imperceptible via the normal central vision system of the brain.

The visual effects can, for example, move in various directions over time, for example translating and/or rotating with respect to a reference frame. Movement of the visual effects can be linear or preferably nonlinear (e.g., with varying velocities, for instance with varying translational velocities of movement and/or varying angular velocities of movement). The visual effect can additionally or alternatively change or vary in size of over time. The visual effect can additionally or alternatively change or vary in color over time. The visual effect can additionally or alternatively change or vary in shape over time. The visual effects can additionally or alternatively change in an amount of transparency or an amount of light transmission through the generated visual effects over time and/or relative an background. The visual effect can additionally or alternatively change or vary one or more temporal properties (e.g., time displayed, time over which a change occurs, marqueeing) over time, for instance with varying time durations. For example, the visual effects can take the form of, or include, flashes of light or geometric shapes (e.g., helical stripes), that may assist in visually evoked potential analysis. The flashes of light or geometric shapes can change in duration; change in contrast; and/or change in luminance over time. The visual effects can, for example, appear at random locations, and/or move in random ways over time. The visual effects can, for example, appear at random spatial locations, and/or move in random ways over time. The visual effects can, for example, take on random appearances (e.g., size, color, shape) over time. The visual effects can, for example, have temporal properties that change randomly over time. In some implementations, the visual effects can, for example, appear and/or change according to a defined pattern, the pattern being sufficiently complicated and over a long enough duration as to not be apparent to a user. Color and/or shape can, for example, be used to address the parasympathetic system, and additionally or alternatively to address myopia or to address Leber congenital amaurosis (LCA) which may be related to the difference in wavelength length for various colors and an inability of an eye subject to certain conditions (e.g., emmetropia, myopia, hyperopia) to properly focus on certain wavelengths. Such can be used to provide light therapy. With regards to light therapy and brain injuries, certain colors or even tinted glasses work better that others. For example, sunglasses from the company Maui Jim have a purple tint and there is another option called FL41 that has a red tint. The color used can be whichever color feels best to a given subject or patient.

The presentation of visual effects preferential in the respective ultra-far peripheral horizontal static field of one eye relative to that of the other eye of a user. Thus, visual effects generator(s) can generate visual effects for one eye at one time and for another eye at another time. The visual effects can be presented in any desired patterns or even random sequences. For example, the visual effects can be presented in any defined sequence or temporal order. Also for example, the visual effects can be presented in which a ratio that specifies a number of instances or frames of visual effects presented to the respective ultra-far peripheral horizontal static field of one eye relative to that of the other eye of a user is not equal to one (e.g., greater than one, less than one). Thus, a clinician can specify any desired pattern, a random sequence, or even specify that some randomness occur in an otherwise specify pattern (e.g., present 4 seconds to first eye, then presented concurrently to both eyes during a repeating number of time intervals with a the total number of images or frames during any given one of those time intervals randomly selected or generated).

As an example, in a situation where a patient's left eye is weaker than their right eye, the clinician can set a ratio that specifies a number of instances or frames of visual effects presented to the respective ultra-far peripheral horizontal static field of one eye relative to that of the other eye of a user. For instance, the clinician can decide to have the presentation of visual effects the respective ultra-far peripheral horizontal static field of the left eye execute 3 cycles of an animation before having the presentation of visual effects the respective ultra-far peripheral horizontal static field of the both eyes execute the same animation concurrently for both eyes. This creates a ratio of 4:1 animation cycles of left eye to right eye. This pattern may then repeat. The clinician can also assign a random number instead of a fixed number (e.g., 3-6) of cycles of animation. This may advantageously avoid a brain of a subject detecting a pattern and becoming conditioned to the treatment.

An animation of one or more visual effects can include a visual effect that changes over time or a series of visual effects presented over a period of time. An animation can, for example, replicate a "bouncing ball" type visual effect, with various parameters set by the particular diagnosis or specified treatment and/or by a clinician. Parameters can, for example, include one or more of: a pause duration per repetition of a cycle of the animation, a velocity of travel of the visual effect (e.g., bouncing ball) in a first direction (e.g., X direction) and/or in a second direction (e.g., Y direction) in the respective ultra-far peripheral horizontal static field of the eyes, an initial size or dimension of a characteristic dimension (e.g., radius, diameter, perimeter) of the visual effect, an maximum and/or minimum size or dimension (e.g., radius, diameter, perimeter) of a characteristic dimension of the visual effect, and, or, a rate of change of a characteristic size or dimension (e.g., radius, diameter, perimeter) of the visual effect.

The visual effects can be rendered as two-dimensional visual effects or rendered as three-dimensional visual effects, or can take the form of two-dimensional visual effects combined with three-dimensional visual effects rendered either concurrently with one another or sequentially with respect to one another or both. For example, a size of a characteristic dimension (e.g., radius, diameter, perimeter) of a visual effect can be varied overtime to produce the effect of the visual effect moving relatively towards and, or, away from the subject. In some implementations, only two-dimensional effects are rendered, hence the setting can be simplified to account for velocity in two dimensions, a size of the characteristic dimension of the visual effect fixed during the rendering or presentation thereof in the respective ultra-far peripheral horizontal static field of the eyes of the subject.

Also for example, a clinician can alternatively or additionally decide that visual effects should be presented into a respective ultra-far peripheral horizontal static field of only one eye. The system can cause the at least one image generator to generate visual effects for only one eye, for example having a first image generator generate visual effects while second image generator does not generate visual effects (e.g., deactivated). This is somewhat similar to the concept of patching one eye to force the other eye to work. This can even be performed along with traditional patching to increase the overall effectiveness. In at least some implementations, the system can even have two distinct and separate or separable portions, allowing the subject to wear one or both portions depending on the specific needs of the particular subject. Alternatively or additionally, one or more portions or one or more image generators can selectively be deactivate, for instance via software instructions if desired.

As yet another example, the system can be set up to present the visual effects on the weaker side at a relatively smaller angle (e.g., 160 degrees) rearwardly from the fovea centralis of the respective eye, while the visual effects are presented to the relatively strong side at a relatively larger angle (e.g., 210 degrees) rearwardly from the fovea centralis of the respective eye. This may advantageously help balance input and visual/brain processing.

The system can also allow a clinician to alternate the presentation of visual effects over time between one side of a head and the other side of the head, and hence alternative between the respective ultra-far peripheral horizontal static fields of the eyes. This may advantageously help lessen sensory overload for a subject, for instance allowing the brain to pay attention to one side before the other side. The system can also add in randomness to the alternating displays, for instance presenting visual effects to a left eye or right eye to be repeated up to randomly generated number of times (e.g., number of times randomly selected from a range of times) before switching to presenting visual effects to the other eye. This approach may advantageously allow a clinician more settings to adjust to a particular subject's specific needs.

As previously explained, the collection of data, particularly real time data, that represents or characterizes one or more physical characteristics of a subject can advantageously be employed to set a balance or otherwise achieve homeostasis between a sympathetic and a parasympathetic system of the subject. This balance might be that the sympathetic system is engaged ⅓ of the time with the parasympathetic system engaged ⅔ in a given day or other period or cycle. It is believed that the most common imbalance of the nervous system is sympathetic being dominant, leading to a wide range of chronic conditions and overall poor health. When the two systems fail to work together in harmony, imbalance occurs (dysautonomia, or autonomic nervous system dysfunction). As noted it is believe that the more common imbalance of the autonomic nervous system is sympathetic nervous system dominance, where the sympathetic nervous system remains dominant most of the time and the parasympathetic is rarely activated. When this occurs, then the body remains in a state of "fight or flight" most of the time or even at all times. The stress response system never or rarely turns OFF. When the body remains in a prolonged state of "fight or flight", degenerative processes begin and if left unaddressed, can result in a variety of chronic health conditions and overall poor health.

Disruptions in homeostasis can lead to a range of health problems, and can be caused by factors such as stress, illness, and other environmental factors. Maintaining homeostasis is an important part of maintaining overall health and well-being, and can be supported through a variety of strategies and practices, such as relaxation techniques, exercise, and healthy lifestyle choices.

As an example, when using a computer or performing near work, a ratio of engagement of the sympathetic system relative to engagement of the parasympathetic system may be out of balance (e.g., different from a specified or desired ratio). Such can, for instance, result in parasympathetic system not being engaged (i.e., engaged 0 amount of the time) or not sufficiently engaged (e.g., engaged only one fifth (⅕) of the total time). While exemplary, these values can be confirmed with a reduction in blinking when a user engages in a task. Using biomarkers (i.e., biometric measurements or biometric characteristics) collected via one or more sensors (e.g., tracking heart rate, or blink rate or blink count), the settings can be adjusted by a threshold/smart/AI algorithm to increase velocity and reduce pause time between repetitions to increase engagement of parasympathetic system.

Applicant submits that the peripheral vision based technique described herein can be used as a parasympathetic recovery technique by focusing on objects or patterns that are located in the far periphery of the visual field. This type of visual focus can help activate the parasympathetic nervous system and promote relaxation by engaging the body's natural "rest and digest" responses. For example, an individual could focus on a calming image or pattern that is located just outside of their central field of vision, and allow their gaze to rest on that image without moving their eyes. This type of visual focus can help reduce stress and promote relaxation by engaging the body's parasympathetic nervous system and allowing it to take over from the sympathetic nervous system, which is responsible for the "fight or flight" response.

The system can be employed in performing eye movement desensitization and reprocessing (EMDR), a bimodal therapy. EMDR generally uses bilateral simulation to heal a wide range of conditions. EMDR has mainly been used to heal trauma such as PTSD. However, EMDR has also been shown to be effective in treating anxiety and stress. Research further suggests EMDR having additional efficacy in treating insomnia and pain.

EMDR works by engaging left and right brain, one at a time, typically in an alternating pattern. One EMDR approach is eye movement desensitization. Such can also be achieved via tactile stimulation, which can be accomplished by, for example, tapping each side of the patient's body (such as tapping on the knees or palms, or shoulders) in an alternating pattern. Another approach for tactile stimulation involves holding paddles in each hand. Simulating the left and right brain by alternating which paddle is vibrating. This has the added advantage of being used for online therapy and in situation where a patient cannot be physically touched due to their condition. Audio stimulation can be used to a similar effect, by engaging left and right ear with audio in an alternating pattern. EMDR techniques can also be combined together. During the bilateral stimulation, the patient or subject may mentally focus of a particular subject, for instance a traumatic memory. Such can also be used to address pain (e.g., chronic pain, acute pain).

The described systems and methods can implement a bilateral simulation of the left and right brain through peripheral vision engagement, audio, vibration, tactile or other sensory stimulation of the left and right brain. The described systems and methods can be adjusted from 2100 to peripheral off center for a more traditional eye movement desensitization, or anywhere in the peripheral field that is most comfortable for the patient or clinician needs. The bilateral simulation can, for example, be implemented via images presented moving from one side of the head to the other, for example moving between a right and a left side of central vision. This approach may advantageously trigger a crossover between a left side and right side of the brain.

Thus, while in some implementations various settings can be automatically and autonomously set by the system itself, for example based on collected, input, or sensed information regarding a subject, condition or diagnosis, in at least some implementations a clinician can manually set or configure the operation of the system, for instance via selection from a number of defined "pre-sets" from which the clinician can select. The presets can, for example, be used by an algorithm, swapping settings based on thresholds for subject specific biomarkers. In at least some implementations, the system implements a "free flow" monitor mode in which the system autonomously adjusts the system's own operational settings "on the fly" based on the biomarkers of the subject sensed or measured or collected in real time via one or more sensors. In at least some implementations, the system provides an option for clinicians to create their own custom settings and/or algorithms for their patient needs. For example, such can allow a clinician to create one setting for normal activities of the subject, one setting for rehabilitation activities for the subject, and, or one setting for use when the subject is working with a computer or otherwise performing near work.

Figures 8A, 8B, 8C:
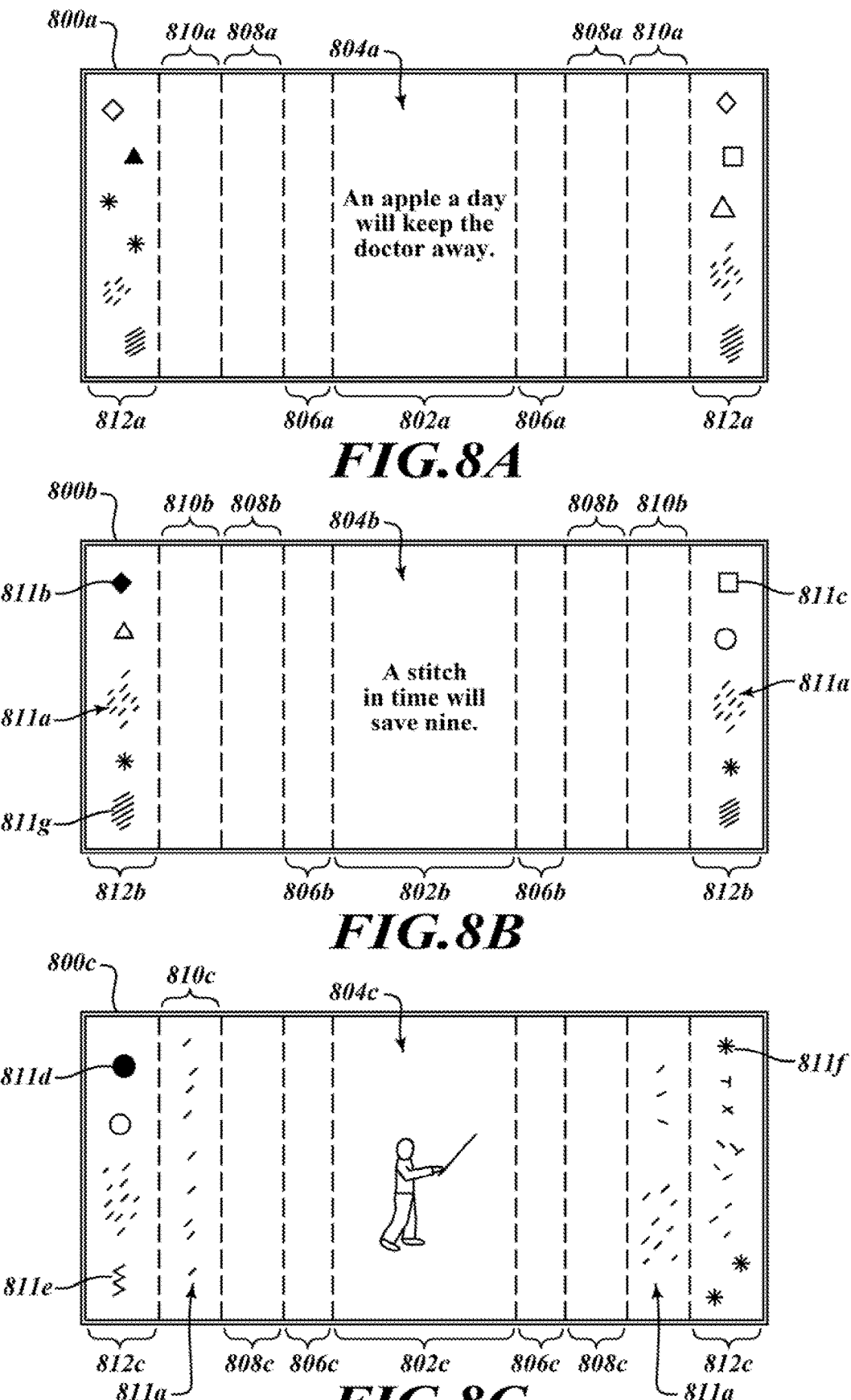
FIG. 8A is a front plan view of a presentation at a first time which includes visual effects in far and/or ultra-far peripheral field to treat aliments and/or enhance brain function, according to at least one illustrated implementation.
FIG. 8B is a front plan view of a presentation at a second time which includes visual effects in far and/or ultra-far peripheral field to treat aliments and/or enhance brain function, according to at least one illustrated implementation.
FIG. 8C is a front plan view of a presentation at a third time which includes visual effects in far and/or ultra-far peripheral field to treat aliments and/or enhance brain function, according to at least one illustrated implementation.

FIGS. 8A, 8B and 8C shows exemplary presentations 800*a*, 800*b*, 800*c*, respectively, at different periods of time, for example sequential periods, according to at least one illustrated implementation.

Each presentation 800*a*, 800*b*, 800*c* includes a central vision field 802*a*, 802*b*, 802*c*, in which content 804*a*, 804*b*, 804*c* is presented. The content 804*a*, 804*b*, 804*c* is information, for example text or written narrative 804*a*, 804*b*, narrative presentation 804*c* with images and/or audio such as a movie, film or television show, a lecture, seminar or other academic presentation, or other content that may require a level of concentration to follow or comprehend.

Each presentation 800*a*, 800*b*, 800*c* includes a near peripheral field 806*a*, 806*b*, 806*c* spaced outwardly of the respective central vision field 802*a*, 802*b*, 802*c*. Content and/or visual effects can optionally be presented in the near peripheral field 806*a*, 806*b*, 806*c* but would likely be perceived by the user.

Each presentation 800*a*, 800*b*, 800*c* includes a mid-peripheral field 808*a*, 808*b*, 808*c* spaced outwardly of the respective near peripheral field 806*a*, 806*b*, 806*c*. One or more visual effects can optionally be presented in the mid-peripheral field 808*a*, 808*b*, 808*c* but may also be perceived by the user.

Each presentation 800*a*, 800*b*, 800*c* includes a far peripheral field 810*a*, 810*b*, 810*c* spaced outwardly of the respective mid-peripheral field 808*a*, 808*b*, 808*c*. One or more visual effects (e.g., flashes of light 811*a*) can optionally be presented in the far peripheral field 810*a*, 810*b*, 810*c* but might also be perceived by the user.

Each presentation 800*a*, 800*b*, 800*c* includes an ultra-far peripheral field 812*a*, 812*b*, 812*c* spaced outwardly of the respective far peripheral field 810*a*, 810*b*, 810*c*. One or more visual effects can optionally be presented in the far peripheral field 810*a*, 810*b*, 810*c* generally will not be perceived by the user. For example, one or geometric shapes include solid geometric shapes 811*b*, transparent geometric shapes 811*c*, colored geometric shapes 811*d* (e.g., red, yellow, green, blue), infrared visual effects 811*e*, luminous visual effects 811*f*, a helical visual effect 811*g* that appears to wind upward or downward (e.g., barber pole effect, e.g., optokinetic drum) over time, to name a few.

Figure 9:
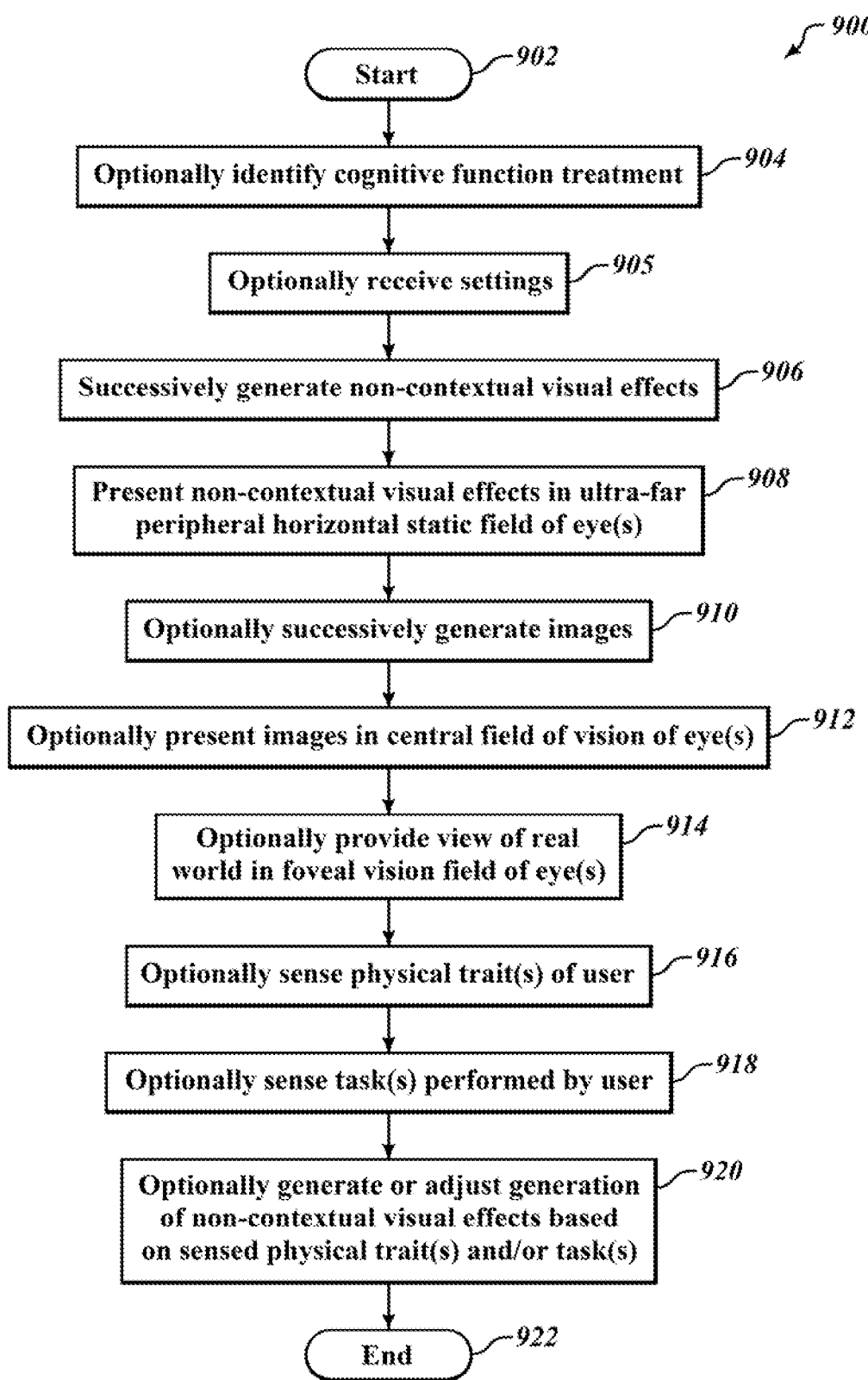
FIG. 9 is a flow diagram showing a method of operation of a system to treat aliments and/or enhance brain function according to at least one illustrated implementation.

FIG. 9 is shows a method 900 of operation of a system to treat aliments and/or enhance brain function according to at least one illustrated implementation. The method 900 can be executed by the system of any of the implementations illustrated or described herein, for example by execution via the control subsystem 314 (FIG. 2), 414 (FIG. 4), 514 (FIG. 5A), 614 (FIG. 6) ad/or 714 (FIG. 7).

The method 900 starts at 902, for example in response to power ON or starting up of the system, or in response to a call or invocation by a calling routine.

Optionally at 904, the system identifies at least one aliment and/or brain function treatment to be performed. The system can, for example, receive input or otherwise be setup or otherwise configured by an operator to treat a particular aliment and/or brain function. The system can, for example, receive input from one or more sensors, for instance physiological sensors, and determine a particular aliment and/or brain function to be treated based on the input. The system can, for example, be used to treat or improve one or more of: traumatic brain injury; acuity, focus, visual convergence, visual sustainability, visual processing, visual field, retinal health, brain field health, visual discrimination, visual spatial memory, ocular motility, pursuits and saccades, hold fixation, convergence/divergence, eye alignment, depth perception, Phorias, occipital cortex, blink rate, digital eye strain, dry eyes, pain (e.g., chronic pain, acute pain), migraine headaches, and/or balance of a user. To the extent that the parasympathetic nervous system affects tumor progression both at the local and systemic levels, the system may even be able to inhibit cancer progression depending on cancer type and receptors expressed within the cancer microenvironment. It is noted that having a dysfunctional nervous system is known to cause a wide range of issues, for example preventing or slowing down healing after surgery; digestion issues, urination issues, arousal issues, blood pressure issues, breathing issues, and sleeping issues such as insomnia. Improving or even achieving homeostasis of the nervous system may treat one or more of these maladies.

Optionally at 905, the system receives one or more inputs. The inputs can, for example, be provided by a clinician via a user interface (e.g., dials, buttons, keys, sliders, touch screen display, user selectable icons). The inputs can take any of a large variety of forms, which can, for example, set one or more operating states or conditions for the system and, or for the operation of at least one visual effects generator. The input(s) can, for instance cause presentation of visual effects preferential in the respective ultra-far peripheral horizontal static field of one eye relative to that of the other eye of a user. Thus, visual effects generator(s) can generate visual effects for one eye at one time and for another eye at another time, in any desired pattern or even random sequence, for instance as described elsewhere herein, based on the inputs. The inputs can, for instance specify a sequence or temporal order, or even a ratio the specifies a number of instances or frames of visual effects presented to the respective ultra-far peripheral horizontal static field of one eye relative to that of the other eye of a user.

Any of the above can employ one or more transducers (e.g., sensors, actuators), for example sensors positioned to sense at least one physical trait of the user and/or speakers or bone conduction transducers positioned to provide audio and or vibration or tactile input to the user, for example advantageously combing sight, sound and tactile input to engage multiple senses of a subject.

At 906, at least one visual effects generator successively generates a plurality of visual effects. The visual effects are preferably non-contextual visual effects, that is non-contextual with respect to content appearing in a central field of vision of at least one of the eyes (i.e., the presented visual effects either have no context or a context that is unrelated with content in a central visual field of the user, if any). The visual effects preferably do not constitute a cursor, a user input field or other user input or control user interface element. The visual effects can be designed to treat or improve one or more of: traumatic brain injury; acuity, focus, visual convergence, visual sustainability, visual processing, visual field, retinal health, brain field health, visual discrimination, visual spatial memory, ocular motility, pursuits and saccades, hold fixation, convergence/divergence, eye alignment, depth perception, Phorias, occipital cortex, blink rate, digital eye strain, dry eyes, pain, migraine headaches, and/or balance of a user.

At 908, at least one optic presents the generated visual effects at least in a respective ultra-far peripheral horizontal static field of at least one of each of two eyes of a user. The ultra-far peripheral horizontal static field of each eye extends rearwardly from a fovea centralis (e.g., perpendicular that extends forwardly of a pupil) of the respective eye in a straight ahead static gaze direction to at least 100 degrees or more rearwardly from the fovea centralis of the respective eye on the same side of the head on which the respective eye resides. The presentation can include presenting the generated visual effects visually-inconspicuously into a respective ultra-far peripheral horizontal static field of at least one of the eyes such that the visual effects are not processed by a primary visual cortex.

Optionally at 910, at least one image generator generates a plurality of images. The images that have a respective subject matter and/or context (e.g., the circumstances that form the setting for an event, statement, or idea, and in terms of which it can be fully understood and assessed). The image can, for example, related to a visual or audiovisual presentation, lesson, lecture, seminar, training session, broadcast, newscast, book reading, movie, sports or athletics event, theatrical production, a virtual book, virtual newspaper, virtual magazine, periodical, video games, smartphone or tablet computer. Optionally at 912, at least one optic presents the generated images at least in a respective central field of vision of at least one of the eyes. Such can, for example be employed in the implementations illustrated and described with respect to FIGS. 4 and 5 and possibly FIG. 6 when operating in a virtual reality mode or possibly an augmented or mixed reality mode.

Optionally at 914, the system can provide a view of a real world environment in a foveal vision field of the user without the aid of any image generator or display. Such can, for example be employed in the implementations illustrated and described with respect to FIGS. 3 and 5 and possibly FIG. 6 when operating in an augmented reality mode.

Optionally at 916, one or more sensors sense one or more physical traits of the user of the device. The sensors can take the form of one or more physiological sensors that reflect perceptual and psychomotor responses of the user. The sensors can take any of a wide variety of forms, for example: blink rate sensor, gaze or eye tracking sensors, heart rate sensors, pulse oxygen saturation sensors, blood pressure sensors, temperature sensors or thermocouples, respiration rate sensors, galvanic skin response sensors, impedance sensors, electrochemical sensors, electromyogram sensors, electroencephalogram (EEG) sensors, electrocardiogram (ECG) sensors, accelerometers, eye fatigue sensors, cameras or other image sensors.

Optionally at 918, one or more sensors can sense one or more tasks being performed or to be performed by the user. For example, cameras or other image sensors can detect a user reading or watching a presentation. Alternatively, the control subsystem can know that the user is experiencing or will be experience an audiovisual presentation, for example a lecture, or a performance.

Optionally at 920, the visual effects generator can adjust the generation of the images based on the physical characteristics and/or tasks. For example, the visual effects generator can produce a first type or group of visual effects to treat aliments and/or enhance brain function when the user has a first set of defined physiological traits and/or is performing or will be performing a first type of task. The visual effects generator can produce a second type or group of visual effects to treat aliments and/or enhance brain function when the user has a second set of defined physiological traits and/or is performing or will be performing a second type of task, the second type or group of visual effects different from the first type or group of physical effects, the second set of defined physiological traits different than the first defined physiological traits, and the second type of task different from the first type of task. Adjustment can, for example, include adjusting an angle at which the visual effects are presented into the respective ultra-far peripheral field of vision of at least one of two eyes of the user.

The method 900 can terminate at 922, for example until or invoked again. Alternatively, the method 900 can run continuously or periodically, for example as a continuous thread of a multi-threaded process.

The apparatus and methods described herein can be customized physically and through software to advantageously balance the sympathetic and parasympathetic system. (As used herein balance does not necessarily mean a 50:50 ratio but rather some defined or specified desired ratio. This is mainly accomplished through engagement of the peripheral vision with secondary support from audio and tactile and other sensory input. The system can employ onboard components and optionally work with third party devices (e.g., smartwatches, fitness bands) to optionally monitor biomarkers. The biomarkers can provide feedback to the subject on the effects of performing certain tasks on their body, for example the effects from using smartphones, laptops, or performing exercise, etc. The biomarkers can also provide feedback that system has on the body of the subject, and allow the software to adjust to the subject's own particular situation. The above approach can help to fix a wide range of health conditions that rely on, or are otherwise affected by, vision, vestibular, neuro, nervous system treatment (mainly parasympathetic). The system can be advantageously employed as a rehabilitation tool and, or as a preventative or prophylactic tool. Use of the system may be able to advantageously increase human performance. Healthy eyes and sight generally lead to a healthy brain, and that leads to a healthy life. Further, the apparatus and methods described herein can also be used as a training tool for teaching people how to use their peripheral vision. For example, in American football a quarterback seeks to avoid tackles to avoid concussions and other injuries. This is done through peripheral awareness. The apparatus and methods described herein can be used to accomplish this. While the apparatus and methods described herein might not be permitted in real sanctioned games, it can be used during drills and exercises to develop a skill set.

Sports, athletics and other human performance can also be improved by improving or achieving homeostasis using the systems, devices and methods described herein. In this respect, it is recognized that the sympathetic and parasympathetic nervous system form the system's autonomic, or involuntary nervous system, which plays a major role in regulating the functions of the cardiovascular system. Furthermore, the heart has its own rich neural system that is not as well-known. An increase in the influence of the sympathetic nervous system causes a rise in blood pressure, heart rate and respiratory frequency, and hence human performance capacity to improve. This can be advantageously employed with athletes or performers (e.g., dancers) during training, and even during competitive performances. The parasympathetic nervous system becomes dominant to sooth the system's functions. Such can cause the heart rate and respiratory frequency to decrease. An increase in heartbeat variability may also occur. Thus, heart rate variability may increase under the influence of the parasympathetic nervous system.

A customized sports vision training program can be designed to improve athletic performance and become a crucial part of athletic training programs. Sports vision training is a customized program of eye exercises that helps athletes hone the visual skills used to excel in their sport. Some of these skills include focusing, eye-tracking, visual reaction time, hand-eye-body coordination, dynamic visual acuity and peripheral awareness. By improving visual skills, the eyes, brain and body begin to work together more efficiently, and timing improves and movements become smoother. The systems, devices and methods described herein can, for example, be used to engage the sympathetic system during exercise or competition, and engage the parasympathetic system during recovery following the exercise or competition.

Sports vision training is a type of training that focuses on heightening an athlete's visual abilities within their sport. Through visual tests and screenings, professionals can determine where a player stands concerning their optical performance. They can then develop a comprehensive training program specific to their strengths, weaknesses, and even their sport of choice. Sports vision training looks at things like hand-eye coordination, dynamic visual activity, visual reaction time, peripheral vision, and tracking focusing. A sports visual exercise or therapy will focus on some or all of the individual vision skills needed for them to reach their highest playing abilities, namely: 1) Eye Tracking: learning to keep your eye on the ball; 2) Peripheral Awareness: the ability to see things out of the corner of your eye; 3) Dynamic Visual Acuity: learning to see objects clearly while they're in motion; 4) Focusing: changing focus from one object to another quickly and clearly; 5) Hand-eye and Body-eye Coordination: being able to use your eyes to direct the movements of hands, body, and other specific limbs; 6) Depth Perception: quickly and accurately judging the distance and speed of something; 7) Reaction Time: the rate at which you can perceive a visual event and react to stimulus 8) Contrast Sensitivity: the ability to distinguish between an object and the background; and 9) Balance: ability to stay upright and in control of body movement. Peripheral vision can improve human performance in a number of ways. For example, using the peripheral vision can improve visual awareness and attention, which can be helpful in activities that require monitoring the environment for potential threats or opportunities. Using the peripheral vision can also improve eye tracking and eye teaming skills, which are important for maintaining a stable and clear visual field. Additionally, focusing on objects or patterns in the peripheral vision can help reduce stress and promote relaxation, which can improve overall well-being and enhance performance in activities that require mental clarity and focus.

Maintaining a state of homeostasis is important for optimizing human performance, as disruptions in this balance can affect mental clarity, focus, and overall well-being. Supporting homeostasis via the various systems, devices, methods and techniques described in the present specification, either alone or in addition to supporting such through strategies such as relaxation techniques, exercise, healthy lifestyle choices, and can help individuals maintain optimal health and performance.

The systems, devices and methods described herein can also be employed to advantageously improve eye-hand coordination or even eye-body coordination. Eye-hand coordination, which is the use of vision to guide hand movements (e.g., reaching and grasping), is essential for upper extremity dexterity. Eye-hand coordination employs the integrated use of eyes, arms, hands, and fingers to produce controlled, accurate, and rapid movements. Normal eye-hand coordination occurs in an ordered sequence: 1) visual detection of the target, 2) focused attention, 3) perceptual identification of the target location, 4) cognitive planning and programming of the reaching movement, and 5) activation of muscles to initiate the action. Eye movements are associated with hand movements, even though the eyes begin and complete their movements more rapidly than the hands begin and complete their own movements. Coordination disorder is any problem or limitation in motor coordination, resulting in a lower than expected performance, for example dependent on a chronological age of a subject.

Improvement of eye-hand coordination as a perceptual-motor skill depends on the visual system as well as efficient eye muscle control. In nearly every sport, the coordination of eye, mind and body is critical to the successful mechanics of the sport. Such can also be useful in less strenuous activities.

The various implementations described above can be combined to provide further implementations. To the extent that they are not inconsistent with the specific teachings and definitions herein, all of the U.S. patents, U.S. patent application publications, U.S. patent applications, foreign patents, foreign patent applications and non-patent publications referred to in this specification, including: U.S. patent application No. 63/301,787, filed Jan. 21, 2022; U.S. patent application No. 63/319,563, filed Mar. 14, 2022; and U.S. patent application No. 63/415,799, filed Oct. 13, 2022), are incorporated herein by reference, in their entirety. Aspects of the implementations can be modified, if necessary, to employ systems, circuits and concepts of the various patents, applications and publications to provide yet further implementations.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

The above described method(s), process(es), or technique(s) may include various acts, though those of skill in the art will appreciate that in alternative examples certain acts may be omitted and/or additional acts may be added. Those of skill in the art will appreciate that the illustrated order of the acts is shown for exemplary purposes only and may change in alternative examples. Some of the exemplary acts or operations of the above described method(s), process(es), or technique(s) are performed iteratively. Some acts of the above described method(s), process(es), or technique(s) can be performed during each iteration, after a plurality of iterations, or at the end of all the iterations.

In some implementations, a single component (e.g., display, projector) can generate both the visual effects and the images, although typically one or more dedicated components (e.g., display, projector) will generate the visual effects while one or more dedicated components (e.g., display, projector) will generate the images, if any. Likewise, in some implementations, a single component (e.g., window, lens other optics) can present both the visual effects and the images, although typically one or more dedicated components (e.g., window, lens other optics) will present the visual effects while one or more dedicated components (e.g., window, lens other optics) will present the images, if any.

The above description of illustrated implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

I claim:

1. A method for operating a device for use with a user having a pair of eyes, the device including: at least one visual effects generator operable to successively generate a plurality of visual effects that are non-contextual with respect to content appearing in a central field of vision of at least one of the eyes; and at least one optic optically coupled to the at least one visual effects generator and positioned rearward of the pair of eyes and oriented to present the generated visual effects at least in a respective ultra-far peripheral horizontal static field of at least one of each of pair of eyes, the ultra-far peripheral horizontal static field of each eye which extends rearwardly from a fovea centralis that extends forwardly of a pupil of the respective eye in a straight ahead static gaze direction to at least 100 degrees or more rearwardly from the fovea centralis of the respective eye thereby to cause display of generated visual effects to the user having the pair of eyes from behind the pair of eyes of the user, the method comprising:

successively generating, by at least one visual effects generator, a plurality of visual effects that are non-contextual with respect to content appearing in a central field of vision of at least one of the eyes and wherein the visual effects do not constitute a cursor, a user input field or other user input or control user interface element; and presenting, via at least one optic, the generated visual effects at least in a respective ultra-far peripheral horizontal static field of at least one of each of two eyes of a user, the ultra-far peripheral horizontal static field of each eye which extends rearwardly from a fovea centralis that extends forwardly of a pupil of the respective eye in a straight ahead static gaze direction to at least 100 degrees or more rearwardly from the fovea centralis of the respective eye.

2. The method of claim 1 wherein successively generating a plurality of visual effects that are non-contextual with respect to content appearing in a central field of vision of at least one of the eyes includes successively generating a plurality of random visual effects.

3. The method of claim 1 wherein successively generating a plurality of visual effects that are non-contextual with respect to content appearing in a central field of vision of at least one of the eyes includes successively generating the plurality of visual effects based at least in part on a task to be performed by the user or a treatment to be performed on the user.

4. The method of claim 1, further comprising:

successively generating, by at least one image generator, a plurality of images; and presenting, via the at least one optic, the generated images at least in a respective central field of vision of at least one of the eyes, with or without one or a combination of focusing or polarization.

5. The method of claim 1 wherein presenting, via the at least one optic, the generated visual effects includes presenting the generated visual effects into the respective ultra-far peripheral horizontal static field and into a far peripheral horizontal static field of at least one of the eyes, the respective ultra-far peripheral horizontal static field which extends rearwardly from the fovea centralis that extends forwardly of the pupil of the respective eye in the straight ahead static gaze direction to 110 degrees or more rearwardly from the fovea centralis of the respective eye and the far peripheral horizontal static field which extends rearwardly from the fovea centralis that extends forwardly of the pupil of the respective eye in the straight ahead static gaze direction to 60 degrees or more rearwardly from the fovea centralis of the respective eye.

6. The method of claim 1 wherein presenting, via the at least one optic, the generated visual effects into a respective ultra-far peripheral horizontal static field of at least one of the eyes includes presenting the generated visual effects into a respective ultra-far peripheral horizontal static field of at least one of the eyes which respective ultra-far peripheral horizontal static field extends rearwardly from the fovea centralis that extends forwardly of the pupil of the respective eye in the straight ahead static gaze direction to 110 degrees or more rearwardly from the fovea centralis of the respective eye.

7. The method of claim 1, further comprising:

generating, by at least one image generator, a number of images; and providing, via the at least one optic, the number of images in a foveal vision field of the user.

8. The method of claim 7, further comprising:

sensing, by at least one sensor, to sense at least one physical trait of the user of the device, the at least one physical trait including any one or more of: acuity, focus, blink rate, gaze or eye tracking, myopia, convergence, sustainability, visual processing, visual field, retinal health, brain field health, visual discrimination, visual spatial memory, ocular motility, pursuits and saccades, hold fixation, convergence/divergence, eye alignment, depth perception, forias, and occipital cortex; and adjusting the generation of the images based on one or more physical characteristics sensed by the at least one sensor.

9. The method of claim 1 wherein successively generating, by at least one visual effects generator, a plurality of visual effects that are non-contextual with respect to content appearing in a central field of vision of at least one of the eyes includes successively generating the visual effects in an IR range of an electromagnetic spectrum.

10. The method of claim 1 wherein the at least one visual effects generator is operable to successively generate a plurality of visual effects to treat or improve one or more of: traumatic brain injury; acuity, focus, visual convergence, visual sustainability, visual processing, visual field, retinal health, brain field health, visual discrimination, visual spatial memory, ocular motility, pursuits and saccades, hold fixation, convergence/divergence, eye alignment, depth perception, Phorias, occipital cortex, blink rate, digital eye strain, dry eyes, pain, migraine headaches, and/or balance of the user.

11. A device for use with a user having a pair of eyes, the device comprising:

at least one visual effects generator operable to successively generate a plurality of visual effects that are non-contextual with respect to content appearing in a central field of vision of at least one of the eyes and wherein the visual effects do not constitute a cursor, a user input field or other user input or control user interface element; and at least one optic optically coupled to the at least one visual effects generator and positioned rearwardly of the pair of eyes and oriented to present the generated visual effects at least in a respective ultra-far peripheral horizontal static field of at least one of each of pair of eyes field health, visual discrimination, visual spatial memory, ocular motility, pursuits and saccades of the user of the device, the ultra-far peripheral horizontal static field of each eye which extends rearwardly from a fovea centralis that extends forwardly of a pupil of the respective eye in a straight ahead static gaze direction to at least 100 degrees or more rearwardly from the fovea centralis of the respective eye of the pair of eyes of the user.

12. The device of claim 11 wherein the at least one visual effects generator is operable to successively generate a plurality of random visual effects.

13. The device of claim 11 wherein the at least one visual effects generator is operable to successively generate the plurality of visual effects based at least in part on a task to be performed by the user or based at least in part on a treatment to be performed on the user.

14. The device of claim 11 wherein the at least one optic is positioned and oriented to present the generated visual effects into a respective ultra-far peripheral horizontal static field and into a far peripheral horizontal static field of at least one of the eyes which respective ultra-far peripheral horizontal static field extends rearwardly from the fovea centralis that extends forwardly of the pupil of the respective eye in the straight ahead static gaze direction to 110 degrees or more rearwardly from the fovea centralis of the respective eye and which far peripheral horizontal static field extends rearwardly from the fovea centralis that extends forwardly of the pupil of the respective eye in the straight ahead static gaze direction to 60 degrees or more rearwardly from the fovea centralis of the respective eye.

15. The device of claim 11 wherein the device is a head worn device, and further comprising:

a front eyeglasses frame;

a first arm that extends rearwardly from a first side of the front eyeglass frame; and a second arm that extends rearwardly from a second side of the front eyeglass frame, and wherein the at least one optic includes a first optic carried by the first arm and a second optic carried by the second arm.

16. The device of claim 11 wherein the device is a head worn device, and further comprising:

a front eyeglasses frame;

a first arm that extends rearwardly from a first side of the front eyeglass frame; and a second arm that extends rearwardly from a second side of the front eyeglass frame, and wherein the at least one optic is one of a first reflector, a first dichroic mirror or a first prism and the second optic is one of a second reflector, a second dichroic mirror or a second prism.

17. The device of claim 11 wherein the device provides a view of a real world environment in a foveal vision field of the user of the device without aid of any image generator or display.

18. The device of claim 11 wherein the at least one optic is optically coupled to at least one image generator to provide a number of images in a foveal vision field of the user of the device.

19. The device of claim 11, further comprising:

at least one sensor operable to sense at least one physical trait of the user of the device, the at least one physical trait including any one or more of: acuity, focus, blink rate, gaze or eye tracking, myopia, convergence, sustainability, visual processing, visual field, retinal health, brain field health, visual discrimination, visual spatial memory, ocular motility, pursuits and saccades, hold fixation, convergence/divergence, eye alignment, depth perception, forias, and occipital cortex; and at least one processor-based system communicatively coupleable to the at least one sensor and operable to adjust the generation of the plurality of visual effects based on one or more physical characteristics sensed by the at least one sensor.

20. The device of claim 11 wherein the generator generates the visual effects in an IR range of an electromagnetic spectrum.

21. The device of claim 11 wherein the device is a head worn device.

22. The device of claim 21 wherein the head worn device is in a form of a set of eyeglasses, a set of goggles, a set of headphones, a helmet, or an earpiece.

23. The device of claim 11 wherein the device is a head worn device and the at least one visual effects generator is operable to successively generate a plurality of visual effects to treat or improve one or more of: traumatic brain injury; acuity, focus, visual convergence, visual sustainability, visual processing, visual field, retinal health, brain field health, visual discrimination, visual spatial memory, ocular motility, pursuits and saccades, hold fixation, convergence/divergence, eye alignment, depth perception, Phorias, occipital cortex, blink rate, pain, migraine headaches, and/or balance of the user of the head worn device.

* * * * *